United States Patent
Chukka et al.

(10) Patent No.: US 10,657,643 B2
(45) Date of Patent: May 19, 2020

(54) MEDICAL IMAGE ANALYSIS FOR IDENTIFYING BIOMARKER-POSITIVE TUMOR CELLS

(71) Applicant: Ventana Medical Systems, Inc.

(72) Inventors: Srinivas Chukka, San Jose, CA (US); Quan Yuan, San Jose, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 16/047,045

(22) Filed: Jul. 27, 2018

(65) Prior Publication Data

US 2018/0336682 A1 Nov. 22, 2018

Related U.S. Application Data

(63) Continuation of application No. 15/243,763, filed on Aug. 22, 2016, now Pat. No. 10,055,840, which is a
(Continued)

(51) Int. Cl.
*A61B 5/00* (2006.01)
*G06T 7/00* (2017.01)
*G06K 9/00* (2006.01)

(52) U.S. Cl.
CPC .......... *G06T 7/0012* (2013.01); *G06K 9/0014* (2013.01); *G06T 2207/10004* (2013.01);
(Continued)

(58) Field of Classification Search
CPC ............... G06K 9/00; G06T 7/00; G21B 1/00
(Continued)

(56) References Cited

U.S. PATENT DOCUMENTS

2006/0041385 A1* 2/2006 Bauer .............. G01N 1/30
702/19
2009/0116724 A1 5/2009 Yamashita et al.
(Continued)

FOREIGN PATENT DOCUMENTS

WO 2005045734 A1 5/2005
WO 2009072098 A1 6/2009
WO 2013148458 A1 10/2013

OTHER PUBLICATIONS

International Preliminary Report on Patentability for PCT/EP2015/053757, dated Sep. 1, 2016, Sep. 1, 2016, 8 pages.
(Continued)

*Primary Examiner* — Abolfazl Tabatabai
(74) *Attorney, Agent, or Firm* — Kilpatrick Townsend & Stockton LLP

(57) ABSTRACT

A method for identifying biomarker-positive tumor cells is disclosed. The method includes, for example, reading a first digital image and a second digital image into memory, the first and second digital image depicting the same area of a first slide; identifying a plurality of nuclei and positional information of said nuclei by analyzing the light intensities in the first digital image; identifying cell membranes which comprise the biomarker by analyzing the light intensities in the second digital image and by analyzing the positional information of the identified nuclei; and identifying biomarker-positive tumor cells in said area, wherein a biomarker-positive tumor cell is a combination of one identified nucleus and one identified cell membrane that surrounds the identified nucleus.

21 Claims, 12 Drawing Sheets

Related U.S. Application Data continuation of application No. PCT/EP2015/053757, filed on Feb. 23, 2015.

(60) Provisional application No. 61/943,271, filed on Feb. 21, 2014.

(52) U.S. Cl.
CPC ............ *G06T 2207/30024* (2013.01); *G06T 2207/30096* (2013.01); *G06T 2207/30242* (2013.01)

(58) Field of Classification Search
USPC ........................................................ 382/128
See application file for complete search history.

(56) References Cited

U.S. PATENT DOCUMENTS

| | | | |
|---|---|---|---|
| 2009/0245598 A1* | 10/2009 | Can | G06T 7/0012 382/128 |
| 2011/0111435 A1 | 5/2011 | Dobson et al. | |
| 2013/0108139 A1 | 5/2013 | Binnig et al. | |
| 2013/0301898 A1* | 11/2013 | Jain | G06T 7/0012 382/133 |
| 2014/0112568 A1 | 4/2014 | Liu et al. | |

OTHER PUBLICATIONS

International Search Report and Written Opinion for PCT/EP2015/053757, dated May 20, 2015, 11 pages, May 20, 2015, 11 pages.

\* cited by examiner

MEDICAL IMAGE ANALYSIS FOR IDENTIFYING BIOMARKER-POSITIVE TUMOR CELLS

CROSS-REFERENCE TO RELATED APPLICATIONS

This patent application is a continuation of U.S. patent application Ser. No. 15/243,763 filed on Aug. 22, 2016, which is a continuation of International Patent Application No. PCT/EP2015/053757 filed Feb. 23, 2015, which claims priority to and the benefit of U.S. Provisional Application No. 61/943,271, filed Feb. 21, 2014. Each patent application is incorporated herein by reference as if set forth in its entirety.

FIELD OF THE INVENTION

The present subject disclosure relates to imaging for medical diagnosis. More particularly, the present subject disclosure relates to automatically identifying biomarker-positive tumor cells on a slide.

BACKGROUND AND RELATED ART

In the field of digital pathology, biological specimens such as tissue sections, blood, cell cultures and the like may be stained with one or more stains and analyzed by viewing or imaging the stained specimen. Observing the stained specimen, in combination with additional clinical information, enables a variety of processes, including diagnosis of disease, prognostic and/or predictive assessment of response to treatment, and assists in development of new drugs to fight disease. As used herein, a target or target object is a feature of the specimen that a stain identifies. A target or target object may be a protein, protein fragment, nucleic acid, or other object of interest recognized by an antibody, a molecular probe, or a non-specific stain. Those targets that are specifically recognized bay be referred to as biomarkers in this subject disclosure. Some stains do not specifically target a biomarker (e.g. the often used counterstain hematoxylin). Hematoxylin is a basic/positive compound that binds to and forms salts with acidic, or basophilic, compounds containing negative charges (such as DNA and RNA which are acidic/negative because the nucleic acid building blocks that come off the phosphate backbone are negatively charged) and stains them dark blue or violet. While hematoxylin has a fixed relationship to its target, most biomarkers can be identified with a user's choice of a stain. That is, a particular biomarker may be visualized using a variety of stains depending on the particular needs of the assay. Subsequent to staining, the assay may be imaged for further analysis of the contents of the tissue specimen. An image of an entire slide is typically referred to as a whole-slide image, or simply whole-slide.

Quantitative analysis of a whole-slide, such as counting target objects such as cells of a certain kind, or the quantitation of a staining response for all cells on a slide, is not feasible for human observers. Typically, a whole-slide contains several thousand to several hundred thousand cells, of which all or just a fraction may be relevant for an analysis question at hand Methods from image analysis, computer vision, and pattern recognition can be used for an automated quantitative analysis.

One example of a whole slide image subject to image analysis is a cMET assay (also known as MET). MET is a receptor tyrosine kinase (RTK) known to be amplified, mutated or overexpressed in many solid malignancies, including non-small cell lung cancer (NSCLC). Abnormal MET activation in cancer correlates with poor prognosis, where aberrantly active MET triggers tumor growth, angiogenesis and metastasis. For example, the majority of squamous cell carcinoma (SQCC) expresses the protein product of Met mRNA at levels much lower than or similar to normal lung tissue or bronchial epithelium. Moreover, SQCC characteristically over-express a variant Met mRNA which corresponds to a 5' partially deleted transcript produced by alternative splicing. In contrast, the expression of Met mRNA and its protein product in adenocarcinoma (ADC) and large cell undifferentiated carcinoma are heterogeneous: in approximately 35% and 20% of these subtypes of NSCLC, Met mRNA and its protein product is overexpressed. Among ADC, intermediate to high levels of Met immunoreactivity correlated with greater degree of tumor differentiation. Furthermore, an accentuation of Met immunoreactivity was often noted in cancer cells at the advancing edge of tumors. Thus, Met has been observed to play a role in lung cancer cell invasion and differentiation (Lung Cancer. 1998 April; 20(1):1-16: "Differential expression of Met/hepatocyte growth factor receptor in subtypes of non-small cell lung cancers", Tsao MS1, Liu N, Chen J R, Pappas J, Ho J, To C, Viallet J, Park M, Zhu H).

The cMET assay stains the membranous and cytoplasmic region of the non-neoplastic and malignant cells. The categorization of MET expression in NSCLC is semi-quantitative and may comprise an evaluation of staining intensity and percentage positivity.

Manual assessment of these criteria is difficult or impossible, similar to detection and scoring of membranous and cytoplasmic regions in other IHC ("immunohistochemistry")-stained tissue slides, for assays such as HER2 and EGFR, and for other cancerous tissue types, such as breast and gastric cancers.

SUMMARY

It is an objective of the present invention to provide for an improved medical image analysis method, computer program product and system for identifying biomarker-positive tumor cells as specified in the independent claims Embodiments of the invention are given in the dependent claims Embodiments of the present invention can be freely combined with each other if they are not mutually exclusive.

In one aspect, the invention relates to a medical image analysis method for identifying biomarker-positive tumor cells. The method comprises:
  reading a first digital image and a second digital image into memory; the first and second digital image depict the same area of a first slide; the first slide comprises multiple tumor cells which have being stained with a first stain and with a second stain; the first stain selectively stains nuclei and the second stain selectively stains a particular biomarker; the presence and/or amount of the biomarker in a tumor cell is indicative of a tumor cell belonging to a particular cancer-subtype; the light intensity values of the first digital image correlate with the amount of the first stain in the tumor cells; the light intensity values of the second digital image correlate with the amount of the second stain in the tumor cells;
  identifying a plurality of nuclei and positional information of said nuclei by analyzing the light intensities in the first digital image;

identifying cell membranes which comprise the biomarker by analyzing the light intensities in the second digital image and by analyzing the positional information of the identified nuclei; for example, the positional information may be used for identifying cell membranes not lying in the vicinity of an identified nucleus, and for filtering out or not further processing said identified cell membranes which do not surround an identified nucleus;

identifying biomarker-positive tumor cells in said area, wherein a biomarker-positive tumor cell is a combination of one identified nucleus and one identified cell membrane that surrounds the identified nucleus.

Said features may be advantageous as a highly accurate method of identifying biomarker-positive tumor cells may be provided. Instead of identifying the tumor cells in a single image analysis step, the nuclei and the cell membranes are identified and used as a basis for identifying complete cells. This may increase accuracy because more characteristic features of nuclei and membranes may be evaluated and image analysis algorithms may be used which are specially adapted to identifying nuclei or cell membranes. In addition, instead of identifying the nuclei and the cell membranes independently of each other, the process of identifying the cell membranes also takes into consideration positional information of the already identified nuclei. This may significantly increase accuracy, because staining artifacts whose shape or other property is similar to a cell membrane can be identified as artifacts if, for example, said staining artifacts do not lie within a maximum distance from one of the identified nuclei. Using positional information of the identified nuclei may thus increase the accuracy of cell membrane identification, which again may increase accuracy of biomarker-positive tumor cell identification.

According to embodiments, the method is used for cancer sub-typing. The method further comprises calculating a score. The score is calculated as a derivative of light intensity values of identified cell membranes which belong to identified biomarker-positive tumor cells contained in said area. The score is indicative of the amount of the biomarker in the identified biomarker-positive tumor cells. The method comprises outputting the score, e.g. via a screen or a printer. As the score is indicative of the mount of biomarker in the biomarker-positive tumor cells, and as the amount of the biomarker may be indicative of a particular cancer subtype or a particular prognosis, the score may also be indicative of the cancer subtype and/or the prognosis, e.g. the malignancy of the tumor, the life expectancy of the patient, or the like. According to embodiments, the calculated score is a derivative of light intensity values of identified cell membranes and of light intensity values of cytoplasmic structures.

In addition, or alternatively, the method comprises automatically counting the identified biomarker-positive tumor cells contained in said area, and outputting the counting result. The number of biomarker-positive tumor cells in a given tissue sample may also provide valuable information for cancer subtyping and/or prognosis.

According to embodiments, the area of the first slide is the complete surface of the first slide. Thus, the first and second digital image may cover the complete surface of said slide and may respectively be a whole-slide image or a derivative of a whole-slide image.

According to other embodiments the area of the first slide consists of one or more manually or automatically selected portions of first slide. Each selected portions may also be referred to as "field-of-view", "FOV".

According to embodiments, the first slide comprises a whole-tumor-tissue section.

According to embodiments, the first stain is a stain that selectively stains nucleic acids. For example, the first stain may be hematoxylin. Hematoxylin may be applied to the tissue sample from which the tumor cells of the first slide were derived as a hematoxylin dye containing solution. In particular, the hematoxylin dye containing solution can be a hematoxylin and eosin dyes containing solution.

According to embodiments, the second stain is 3,3'-Diaminobenzidine (DAB).

According to embodiments, the biomarker is a protein which is solely or predominantly contained in the cell membrane and/or on the cytosolic side of the cell membrane. For example, the biomarker may be a membrane protein, a transmembrane domain of a membrane protein or a cytosolic domain of a membrane protein.

According to embodiments, the biomarker is Hepatocyte Growth Factor Receptor (cMET). A cMET assay may be used for selectively staining the cMET biomarker with the second stain, e.g. DAB. In alternative embodiments, the biomarker is HER2 (human epidermal growth factor receptor 2, erb-B2, c-erbB2) or EGFR (epidermal growth factor receptor). Accordingly, a HER2 assay or an EGFR assay may be used for selectively staining the HER2 or EGFR biomarker with the second stain, e.g. DAB. Thus, it may be possible to accurately identify biomarker-positive tumor cells for a variety of different biomarkers, and to automatically apply cancer sub-typing for a variety of different cancer types.

According to embodiments, the method further comprises:

acquiring image data from the first slide, the image data comprising multi-spectral unprocessed pixels; for example, the image data may be an RGB raw image taken from the area of the slide;

spectral unmixing of the multi-spectral unprocessed pixels by applying a spectral-deconvolution operation, thereby creating the first digital image and the second digital image. The first digital image highlights the nuclei stained with the first stain, e.g. hematoxylin. The first digital image may also be referred to as HTX channel image. The second digital image highlights the cell membranes and any cytosolic structures comprising a biomarker stained with the second stain, e.g. DAB. Thus, the second digital image may also be referred to as "DAB channel image".

According to embodiments, the method comprises reading a further digital image of a second slide into memory. The first slide comprises tumor cells contained in a first tissue section of a tumor tissue. The tumor cells of the second slide are contained in a second tissue section of said tumor tissue, the first and the second tissue sections being adjacent serial tissue sections. The further digital image comprises one or more medical annotations. For example, the annotations may be manual annotations of a physician or may be annotations having been automatically generated by an image analysis software application. For example, the second slide may be an annotated tumor image of an H&E (hematoxylin & eosin) stained tumor tissue sample.

The method further comprises automatically comparing optical features of the further digital image with optical features of the first or second digital image for automatically mapping the further digital image to the first and/or second digital image. For example, the optical features may be line, edge or corner structure information or any other kind of structural information extracted from the compared images.

The optical features may be, for example, extracted structural information of cell components or cells or tissue structures or artifacts which may be depicted in the further digital image and in the first and/or second digital image or in an original RGB image from which said first or second image was derived. Said mapping process may also be referred to as "inter-marker registration algorithm". An inter-marker registration algorithm is described, for example, in "11th International Symposium on Biomedical Imaging (ISBI), 2014 IEEE, Apr. 29, 2014-May 2, 2014). Other examples for inter-marker registration algorithms are given in "a comparison of soft-tissue implanted markers and bony anatomy alignments for image-guided treatments of head-and-neck cancers", Zeidan O A et al., Int J Radiat Oncol Biol Phys. 2010 Mar. 1; 76(3):767-74. doi: 10.1016/j.ijrobp.2009.02.060. Epub 2009 May 7. A further example for the inter-marker registration algorithm is given in the detailed description of this application.

After the mapping, the annotations of the further digital image are automatically transferred to corresponding regions in the mapped first and/or second digital image. Thereby, the annotations in the further digital image are mapped to corresponding regions of the first and/or second sub-image. In particular, the annotations can be mapped to the second digital image, the DAB-stained cMET image.

According to embodiments, the method further comprises automatically analyzing spectral and/or shape features of the identified nuclei in the first digital image for identifying nuclei of non-tumor cells. For example, blobs may be identified in the first digital image in a first step. A "blob" as used herein can be, for example, a region of a digital image in which some properties, e.g. the intensity or grey value, are constant or vary within a prescribed range of values. All pixels in a blob can be considered in some sense to be similar to each other. For example, blobs may be identified using differential methods which are based on derivatives of a function of position on the digital image, and methods based on local extrema. A nuclear blob is a blob whose pixels and/or whose outline shape indicate that the blob was probably generated by a nucleus stained with the first stain. For example, the radial symmetry of a blob could be evaluated to determine if the blob should be identified as a nuclear blob or as any other structure, e.g. a staining artifact. For example, in case a blob has a lengthy shape and is not radially symmetric, said blob may not be identified as a nuclear blob but rather as a staining artifact. Depending on the embodiment, a blob identified to be a "nuclear blob" may represent a set of pixels which are identified as candidate nuclei and which may be further analyzed for determining if said nuclear blob represents a nucleus. In some embodiments, any kind of nuclear blob is directly used as an "identified nucleus". In some embodiments, filtering operations are applied on the identified nuclei or nuclear blobs for identifying nuclei which do not belong to biomarker-positive tumor cells and for removing said identified non-tumor nuclei from the list of already identified nuclei or not adding said nuclei to the list of identified nuclei from the beginning. For example, additional spectral and/or shape features of the identified nuclear blob may be analyzed to determine if the nucleus or nuclear blob is a nucleus of a tumor cell or not. For example, the nucleus of a lymphocyte is larger than the nucleus of other tissue cell, e.g. of a lung cell. In case the tumor cells are derived from a lung tissue, nuclei of lymphocytes are identified by identifying all nuclear blobs of a minimum size or diameter which is significantly larger than the average size or diameter of a normal lung cell nucleus. The identified nuclear blobs relating to the nuclei of lymphocytes may be removed (i.e., "filtered out from") the set of already identified nuclei. By filtering out the nuclei of non-tumor cells, the accuracy of the method may be increased. Depending on the biomarker, also non-tumor cells may express the biomarker to a certain extent, and may therefore produce an intensity signal in the first digital image which does not stem from a tumor cell. By identifying and filtering out nuclei which do not belong to tumor cells from the totality of the already identified nuclei, the accuracy of identifying biomarker-positive tumor cells may be increased.

This may be advantageous, as cMET can non-specifically stain some non-membranous structures (or artifacts). But those artifacts can be identified and removed by identifying cell nuclei in the first digital image, and by selectively examining intensity values in the second digital image around the detected nuclei.

A "tumor" as used herein does not necessarily consist of malignant cancer cells. A "tumor" is a mass of adjacent cells characterized by an abnormal growth of the body tissue from which the tumor is made of. Thus, a tumor cell may be a malignant cancer cell of some cancer type, but may also be a non-malignant cell of a benign tissue lump or swelling. A "tumor cell" may thus, for example, simply be a cell of the same cell type as the tissue from which the tumor section on the slide was derived, e.g. "lung cells" contained in lung tumor tissue slices, "colon cells" for colon tumor tissue slices, and the like.

A "biomarker-positive tumor cell" as used herein can be, for example, a tumor cell whose cell membrane (and/or whose cytosolic domain of incorporated cell membrane protein) comprises a biomarker. In order to increase accuracy, according to embodiments only those tumor cells are identified as biomarker-positive tumor cells which consist of a combination of a nucleus identified via the first stain and a cell membrane with a biomarker that was identified via the second stain, whereby the cell membrane surrounds said nucleus. An "identified cell membrane" as used herein covers the cell membrane and also any kind of cytosolic membrane protein domain extending to the cytosolic side of the cell membrane. Depending on the biomarker used, the biomarker may be confined completely to the cell membrane and/or may be located, for example, in the vicinity of and at the cytosolic side of the cell membrane.

In addition, or alternatively, the method comprises automatically analyzing spectral and/or shape features of the identified cell membranes in the second digital image for identifying cell membranes of non-tumor cells. For example, the circumference of some non-tumor cells, e.g. lymphocytes, may be larger than the circumference of a lung cancer cell or a colon cancer cell. Also, the shape of some non-tumor cells, e.g. stroma cells, may differ significantly from the shape of a tumor cell, e.g. a lung tumor cell or a colon tumor cell: tumor cells often are less differentiated and show a round shape while e.g. stroma cells often have a lengthy shape. The cell membranes which have been identified as belonging to a non-tumor cell may be removed ("filtered out") from the totality of identified cell membranes in the second digital image. By identifying and filtering out cell membranes which do not belong to tumor cells from the totality of the already identified cell membranes, the accuracy of identifying biomarker-positive tumor cells may be increased.

According to embodiments, a biomarker-positive cell is only identified as a biomarker-positive tumor cell if neither its identified nucleus nor its identified cell membrane were identified as belonging to a non-tumor cell. Biomarker-positive cells comprising a cell membrane identified as the cell membrane of a non-tumor cell and/or comprising a nucleus identified as the nucleus of a non-tumor cell are filtered out from the totality of identified biomarker-positive tumor cells before calculating a score for and/or before counting the number of the identified biomarker-positive tumor cells. Alternatively, biomarker-positive cells comprising a cell membrane and/or a nucleus of a non-tumor cell are not identified as biomarker-positive tumor cell from the beginning.

According to embodiments, the identification of the nuclei by analyzing the light intensities in the first digital image comprises automatically applying a segmentation, thresholding and/or radial-symmetry based nuclei detection algorithm on the light intensities in the first digital image for identifying the nuclei.

Ridge-Detection Based Cell Membrane Detection and Mask-Based Refinement

According to embodiments, the identification of the cell membranes comprises:

applying a ridge detection algorithm on the second digital image for identifying in the second digital image objects comprising the biomarker and for outputting an intermediate image, the intermediate image being indicative of the identified objects comprising the biomarker; for example, any kind of object comprising the biomarker may be detected by the ridge detection object which has a ridge-like shape and optionally a light intensity over a predefined threshold value; for example, the ridge detection may be based on picking up local intensity maxima in the second digital image and connecting them to form a continuous line; the terms "ridge detection" and "stroke detection" are used herein as synonyms; generating a binary refinement mask from the second digital image and from the positional information of the identified nuclei by applying a threshold-based segmentation algorithm on the second digital image, wherein in the binary refinement mask all pixels whose intensity is below the threshold of the segmentation algorithm and which lie outside a maximum distance from any one of the identified nuclei are mask pixels; for example, the threshold-based segmentation algorithm can be an Otsu thresholding algorithm;

mapping and applying the binary refinement mask on the intermediate image, thereby removing or masking all intensity values of pixels in the intermediate image which are mapped to a mask pixel; the result of the applying of the mask is the generation of a masked image, the masked image being selectively indicative of objects comprising the biomarker and lying within the maximum distance (e.g. 12 µm) from any of the identified nuclei; and applying a watershed segmentation algorithm on the masked image for identifying the cell membranes, thereby selectively taking as input intensity values of un-masked pixels.

Optionally, the method further comprises outputting a refined image, the refined image being a derivative of the intermediate image and comprising the identified cell membranes identified by the watershed segmentation algorithm. As the watershed segmentation algorithm was applied on the un-masked pixels of the masked image only, also the refined image selectively comprises the identified cell membranes in regions of the second digital image which were not masked by mask pixels of the binary refinement mask.

This may be advantageous, because the information if a pixel lies within the maximum distance from any of the identified nuclei is taken into consideration when creating the refinement mask, and therefore also has an impact on the cell membrane identification step. Thus, the accuracy of membrane identification and the accuracy of biomarker-positive tumor cell identification may be increased.

The Otsu thresholding algorithm, also known as "Otsu's method", is a global thresholding approach whose objective is to minimize the average error incurred in assigning pixels to two or more groups (also called classes). For example, one class may be the class of pixels whose intensity value is above the intensity threshold, another class may be the class of pixels whose intensity value is below the intensity threshold. The pixels of the other class will all become mask pixels. Pixels of the first class will only become mask pixels (e.g. in a later step following Otsu's method) if they lie outside the maximum distance from any one of the identified nuclei. The Otsu thresholding algorithm maximizes the between-class variance, a measure used in statistical discriminant analysis. Well-thresholded classes should be distinct with respect to the intensity values of their pixels and, conversely, a threshold giving the best separation between classes in terms of their intensity values is the best (optimum) threshold.

For example, the Otsu thresholding algorithm can assume that the second digital image comprises two classes of pixels, e.g. high-intensity pixels which shall not be masked, and low-intensity pixels which shall be masked. It calculates the optimum threshold separating the two classes from a histogram of the second digital image so that the combined spread of said two classes (intra-class-variance) is minimal.

Using the Otsu thresholding algorithm may be beneficial as it is based entirely on computations performed on the histogram of an image, an easily obtainable 1-D array.

According to embodiments, the generation of the binary refinement mask further comprises:

identifying cellular blobs of approximate cell size in the second digital image or in a refined version of the second digital image, determining the geometrical center of said identified cellular blobs and using the determined geometrical centers as additionally identified nuclei; and/or performing a morphological analysis of nuclear blobs in the first digital image for identifying nuclear blobs stemming from nuclei of non-tumor cells, and filtering out all identified nuclei having been derived from said identified nuclear blobs; for example, all pixels of said non-tumor nuclei could be turned into mask pixels; in addition, or alternatively, said identified nuclei may be removed from the totality of nuclei having been identified by analyzing the first digital image; and/or performing a size analysis of nuclear blobs in the first digital image for identifying nuclear blobs whose size corresponds to less than a predefined fraction, e.g. 80%, of the diameter of a typical nucleus of the analyzed tumor cells; for many tumor cells, the typical nucleus diameter is 1-2 µm; and filtering out all identified nuclei having been derived from said identified nuclear blobs; for example, all pixels of said under-sized nuclei could be turned into mask pixels; in addition, or alternatively, said identified undersized nuclei may be removed from the totality of nuclei having been identified by analyzing the first digital image; and/or filtering out all identified nuclei having been derived from an identified nuclear blob in the first digital image in case said nuclear blob lies in a first image section of the first digital image whose total light intensity is below a first intensity threshold and in case in addition the total light intensity of a corresponding second image section of the second digital image is below a second intensity threshold. For example, the size of said section in the slide may be 100 μm×100 μm or larger, e.g. 200 μm×200 μm. This filtering step may allow filtering out intensity signals in larger image regions which lack a signal of sufficient intensity, i.e., in larger image regions which do not comprise cells with sufficient nuclear staining. All pixels of said first image section are turned into mask pixels;

Using a watershed algorithm may be beneficial as it produces stable segmentation results, including connected segmentation boundaries, and provides a simple framework for incorporating knowledge-based constraints in the segmentation process. A knowledge-based constraint may be, for example, that the rings or walls have to surround an identified nucleus to be considered as a candidate for a cell membrane.

A watershed algorithm is an algorithm which interprets intensity values of pixels of a digital image as altitude values in a topographic relief. A drop of water falling on the topographic relief flows along a path to finally reach a local minimum. The watershed of a relief corresponds to the limits of the adjacent catchment basins of the drops of water. In such a topographic interpretation of an image, three types of pixels (points) exist: a) pixels belonging to a regional minimum; b) pixels at which a drop of water, if placed at the location of any of those pixels, would fall with certainty to a single minimum; and c) pixels at which water would be equally likely to fall to more than one such minimum. For a particular regional minimum, the set of pixels satisfying condition b) is called the catchment basin or watershed of that minimum. The pixels satisfying condition c) form crest lines on the topographic surface and are termed watershed lines. The principal objective of a watershed-based segmentation algorithm is to find the watershed lines. The basic idea is that each regional minimum ("catchment basin") of the entire topography is flooded at a uniform rate. When the rising water in distinct catchment basins is about to merge, a dam is built to prevent the merging. The flooding will eventually reach a stage when only the tops of the dams are visible above the waterline. These dam boundaries correspond to the watershed lines. Therefore, they are the (connected) boundaries extracted by a watershed segmentation algorithm. The watershed lines are the desired segmentation results. The watershed lines form connected paths, thus giving continuous boundaries between regions. Said boundaries are identified as cell membranes.

According to embodiments, the watershed segmentation algorithm is a marker-based the watershed segmentation algorithm. The application of the watershed segmentation algorithm comprises:

mapping the identified nuclei in the first digital image on the intermediate image;
using each of the mapped identified nuclei as a watershed-marker for applying a marker based watershed segmentation algorithm on unmasked pixels for identifying a coherent ring or dam structure around each of the mapped identified nuclei, and
using the identified ring or dam structure the identified cell membrane.

A marker-based watershed algorithm comprises two principal steps: a preprocessing step for identifying watershed markers in the digital image and a step of applying the watershed segmentation algorithm on the digital image under the restriction that the identified watershed markers are the only allowed regional minima.

For example, the identified nuclei may be used as watershed markers, i.e. as the only allowed local minima around which a watershed line can be identified by the above described watershed segmentation procedure. The preprocessing step comprises mapping the identified nuclei in the first digital image on the intermediate image and using each of the mapped identified nuclei as a watershed-marker. Then, the watershed segmentation algorithm is applied on the intermediate digital image under the restriction that the identified nuclei are the only allowed regional minima.

Using a marker-based watershed segmentation algorithm may be advantageous, because direct application of a watershed segmentation algorithm (without any marker) may lead to oversegmentation due to noise and other local irregularities of the digital image. Oversegmentation can be serious enough to render the results of the algorithm virtually useless. A marker-based watershed segmentation algorithm may solve this problem by limiting the number of allowable regional minima by incorporating a preprocessing (marker identification) step designed to bring additional knowledge into the segmentation procedure. The additional knowledge is provided in the form of a marker, referred herein as "watershed marker".

A watershed marker is a connected component of a digital image belonging to or being mapped onto the digital image on which the watershed algorithm is applied. Said connected component of the digital image constitutes the only allowed regional minimum when applying the watershed segmentation algorithm on the digital image. Thus, the number and position of watershed markers in a digital image determine the number and position of the allowed local minima.

According to embodiments, the original RGB image from which the second digital image and the intermediate digital image was derived is smoothed by a smoothing filter in order to reduce the number of local minima in the intermediate digital image which could result in an over segmentation. Alternatively, the intermediate digital image is smoothed. Thus, the watershed algorithm is applied on the smoothed intermediate digital image.

According to embodiments, the identification of the cell membranes by the ridge detection algorithm comprises applying a ridge detection algorithm on the second digital image or a refined version thereof for identifying any kind of object comprising the biomarker. Various ridge or line identification algorithms known in the art may be used.

According to some embodiments, applying the ridge detection algorithm comprises:

identifying for each pixel P in the second digital image the intensity values of a set of adjacent pixels p1-p8;
if the intensity of the pixel P is a local maximum in respect to the intensity values of the set of adjacent pixels p1-p8, determining that the pixel P represents an object comprising the biomarker. The totality of pixels P having been identified as biomarker-stained cell membrane may constitute the identified cell membrane.

Using a combination of a ridge detection approach and a refinement mask may increase accuracy, as the refinement mask comprising positional information of the identified nuclei is used for filtering out intensity signals in the second digital image which probably do not belong to a biomarker-positive tumor cell. In addition, when using a marker-based watershed segmentation approach, positional information of the nuclei may be used for increasing the accuracy of cell membrane detection by using the center of the identified nuclei as watershed marks.

Spoke Based Membrane Detection

According to embodiments, the identification of the cell membranes is implemented as spoke detection approach. The spoke detection approach comprises:

mapping the nuclei identified in the first digital image on the second digital image;

for each of the mapped identified nuclei in the second digital image, evaluating relative intensity differences in the second digital image between the center of the mapped nucleus and pixels along lines radially extending from said center for identifying the cell membrane of said mapped identified nucleus.

According to embodiments, the identification of the cell membranes for each of the mapped identified nuclei comprises:

mapping a set of lines, also referred to as vectors, on the center of the identified and mapped nucleus, wherein each of said lines starts in said center and radially extends outwards up to a maximum length threshold; for example, the maximum length threshold may be set to the maximum expected radius of a tumor cell. For example, the maximum length threshold may be 12 μm or 10 μm. Said threshold may be larger than the average radius of many tumor cells to address the possibility that a tumor cell might not be radially symmetric. There may be more than 4, preferentially 16 or 32 lines which extend from the center of the nucleus. The angles between two adjacent lines may be evenly sampled from 0 to 360 degrees, e.g. 22.5° for 16 lines.

providing a first intensity threshold T1 and a second intensity threshold T2; said value may be set by a user based on known typical intensity values received when a particular combination of biomarker and/or second stain is used;

determining, for each of said lines, a maximum intensity value in the second digital image; a set of connected pixels adjacent to said maximum intensity value pixel which typically also have high intensity values can be identified as a candidate for a membrane region;

determining the median MedianMax_I of all maximum intensity values identified for all lines extending from the center of said nucleus;

determining, for each of said lines, a minimum intensity value in the second digital image;

determining the median MedianMin_I of all minimum intensity values identified for all lines extending from the center of said nucleus;

determining the intensity of the center Center_I of the mapped identified nucleus in the second digital image;

identifying, in each of said lines, an adjacent set of pixels having maximum intensity values within said line (the candidate membrane region pixels mentioned above) as parts of a cell membrane only in case MedianMax_I is at least the first intensity threshold (T1) greater than the determined intensity of the center (Center_I) and if the median of all minimum intensity values is at most the second intensity threshold (T2) smaller than the determined intensity of the center (Center_I);

supplementing the set of pixels identified as being part of the cell membrane with additional pixels, the additional pixels connecting disconnected subsets of the identified set of pixels; thus, the additional pixels may connect the candidate membrane regions within each of the lines extending from the mapped center of the nucleus, thereby creating a connected ring of pixels which represents the cell membrane that shall be identified; and returning the supplemented set of pixels as the identified cell membrane of said mapped identified nucleus.

Using relative intensity values in respect to the center of the cell and the median of the maxima and minima may be advantageous as this approach may be robust against intensity differences of different tumor cells which may relate to staining artifacts, not to a difference in the absolute amount of biomarker contained in the cell membrane.

According to embodiments, the calculated score is a membrane-completeness score. The calculation of the membrane-completeness-score comprises:

identifying, in the second digital image and for each identified biomarker-positive tumor cell individually, a circumferential belt of pixels; the circumferential belt of pixels is centered along the identified cell membrane; for example, the belt of pixels can be identified by expanding all pixels contained in the identified cell membrane of said cell by a predefined number of pixels by a predefined number of pixels, e.g. 2 pixels, both in the direction of the cell center and in the direction of the extracellular space; the identified cell membrane may have been identified via the stroke-based approach or via the spoke based approach described above;

determining, in the second digital image and for each identified biomarker-positive tumor cell, the fraction of pixels in the belt of pixel whose light intensity exceed an intensity threshold value, the fraction being indicative of the completeness of the identified membrane; and optionally filtering out the identified biomarker-positive tumor cell in case its determined fraction indicates that the cell membrane of said cell was identified incompletely.

According to embodiments, the predefined number of pixel is chosen such that the thickness of said belt covers 1 μm of the first slide. According to some embodiments, 1 pixel in the first or second digital image may correspond to 0.2-0.4 μm of the slide.

For example, each pixel in the belt of pixels may be compared with a predefined intensity threshold value that reflects the expected intensity value in case a pixel stems from a slice section comprising the stained biomarker. The intensity threshold value will depend on the biomarker and the second stain that is used. In case 80% or more of the pixels of the belt have a higher intensity value than said predefined intensity threshold value, the cell membrane covered by said circumferential belt is considered as complete. In case more than 20% but less than 80% of the pixels of the belt have a higher intensity value than said predefined intensity threshold value, the cell membrane covered by said circumferential belt is considered as partially complete. In case less than 20% or the pixels of the belt have a higher intensity value than said predefined intensity threshold value, the cell membrane covered by said circumferential belt is considered as incomplete or absent.

Calculating a membrane completeness score may help to evaluate and estimate the accuracy of the tumor cell identification. The watershed approach, for example, may automatically create and extend "artificial dams" along identified watershed lines which may cover even regions of the slide where no biomarker signal could be observed. By calculating the completeness score for such a tumor cell, it may be determined that actually the signal is too weak to safely consider said tumor cell as a biomarker-positive cell. Such tumor cells may be identified, by the completeness score calculation step, as a tumor cell with an incomplete or absent cell membrane. Such a tumor cell may be re-categorized as a biomarker-negative tumor cell. In addition, a tumor cell having an incomplete or absent cell membrane may be identified as a hint that the tumor cells do not express the biomarker or express the biomarker in a very limited amount. In addition, calculating a completeness score may allow assessing the quality of any calculated intensity based score.

According to embodiments, the score is a membrane-intensity score. The calculation of the membrane-intensity-score comprises:

measuring, in the second digital image and for each identified biomarker-positive tumor cell individually, the light intensities of all pixels which are located within the identified cell membrane of said identified biomarker-positive tumor cell and/or which lie within a cytoplasmic region surrounded by said identified cell membrane of the identified biomarker-positive tumor cell; and comparing the measured light intensities of at least one predefined fraction, e.g. 50%, of all the identified biomarker-positive tumor cells with one or more threshold values for predicting the cancer-type the tumor cells belong to and/or for predicting the disease progression.

In a further aspect, the invention relates to a tangible non-transitory storage medium to store digitally encoded instructions executable by a processor to perform a method according to any one of the previous embodiments.

In a further aspect, the invention relates to a medical image analysis system, the system comprising a processor and a memory coupled to the processor. The memory is used to store instructions that, when executed by the processor, cause the processor to perform operations comprising:

reading a first digital image and a second digital image into memory, the first and second digital image depicting the same area of a first slide;

reading a first digital image and a second digital image into memory, the first and second digital image depicting the same area of a first slide;

the first slide comprising multiple tumor cells having being stained with a first stain and with a second stain;

the first stain selectively staining nuclei; for example, the first stain may unspecifically stain the nucleus of any kind of cells and thus may stain tumor cells as well as non-tumor cells;

the second stain selectively staining a particular biomarker, the presence and/or amount of the biomarker in a tumor cell being indicative of a tumor cell belonging to a particular cancer-subtype;

the light intensity values of the first digital image correlating with the amount of the first stain in the tumor cells;

the light intensity values of the second digital image correlating with the amount of the second stain in the tumor cells;

identifying a plurality of nuclei and positional information of said nuclei by analyzing the light intensities in the first digital image;

identifying cell membranes which comprise the biomarker by analyzing the light intensities in the second digital image and by analyzing the positional information of the identified nuclei;

identifying biomarker-positive tumor cells in said area, wherein a biomarker-positive tumor cell is a combination of one identified nucleus and one identified cell membrane that surrounds the identified nucleus.

In a further aspect, the invention relates to a system for scoring an assay. The system comprises a processor and a memory coupled to the processor. The memory is used to store instructions that, when executed by the processor, cause the processor to perform operations comprising:

identifying a plurality of nuclei in a portion of an image; and determining whether any surrounding regions of one or more nuclei out of the plurality of nuclei can be associated with a membrane;

wherein a positive association of said one or more nuclei with a membrane results in a determination of a positively stained cell.

According to embodiments, the portion of the image is a whole-tumor region annotated on a hematoxylin image.

According to embodiments, the annotated region is mapped to a cMET image of a corresponding serial section using an inter-marker registration algorithm.

According to embodiments, the operations further comprise computing a slide-level score for the whole-tumor region.

According to embodiments, the portion of the image is a field-of-view annotated on a cMET image.

According to embodiments, the operations further comprise computing a slide-level score for the field-of-view.

According to embodiments, the determining whether the surrounding regions of said one or more nuclei may be associated with a membrane includes performing a stroke detection operation.

According to embodiments, the stroke detection operation includes measuring a relative intensity of a center pixel with an array of pixels around said center pixel, and comparing the relative intensity with a threshold, wherein meeting or exceeding the threshold causes the pixel to be associated with a membrane.

According to embodiments, the determining whether the surrounding regions of said one or more nuclei may be associated with a membrane includes performing a spoke detection operation.

According to embodiments, the operations further comprise refining a detection of the nuclei and the determination of the membrane.

According to embodiments, the refining further comprises generating a mask on a DAB channel of the image using Otsu thresholding.

According to embodiments, the refining further comprises applying the mask to one or more of the detected nuclei and the determined membranes and removing any detected nuclei and membranes based on the application of the mask.

According to embodiments, the operations further comprise computing at least one of a membrane intensity score or a completeness score.

According to embodiments, the operations further comprise binning the image into a category depending on a total score based on the intensity score or the completeness score.

According to embodiments, binning the image into the category depends on whether or not the total score meets a threshold.

In a further aspect, the invention relates to a system for scoring an assay. The system comprises a processor and a memory coupled to the processor. The memory is used to store instructions that, when executed by the processor, cause the processor to perform operations comprising:

determining whether or not a structure detected within a range of an identified tumor nuclei in a field of view of an IHC image is associated with a membrane or cytoplasmic feature, wherein when said structure detected is associated with the membrane or cytoplasmic feature, the identified tumor nuclei is considered a positively stained cell; and scoring the IHC image based on a plurality of positively stained cells based on at least one of an intensity feature or a completeness feature.

According to embodiments, the operations further comprise using a stroke-detection operation to detect the structure within the range of the identified tumor nuclei.

According to embodiments, the operations further comprise using a spoke-detection operation to detect the structure within the range of the identified tumor nuclei.

According to embodiments, the operations further comprise refining the identified membrane features based on a threshold mask generated from the DAB channel.

In a further aspect, the invention relates to a tangible non-transitory storage medium to store code that is executed by a processor to perform operations comprising:

identifying a number of membrane features within a vicinity of a nucleus identified in an IHC image, wherein the nucleus is identified in a hematoxylin channel deconvolved from the IHC image, and wherein the number of membrane features are identified in a DAB channel deconvolved from said IHC image; and scoring the IHC image based on the number of membrane features identified.

The image is binned into one of four categories based on the score.

Embodiments of the invention provide for systems and computer-implemented methods for analyzing and scoring an image of tissue slide stained with an IHC assay which stains membranous and cytoplasmic regions; for example a c-MET IHC assay, by selecting whole tumor region or a set of tumorous fields of views to analyze and score, detecting nuclei-like structures in a field of view of the image, analyzing the nuclei-like structures, e.g. nuclear blobs, to identify whether the nuclei-like structures are tumor nuclei, detecting at least one of membrane and cytoplasmic structures in the field of view, associating the at least one of the membrane and cytoplasmic structures in the field of view with at least one of the identified tumor nuclei using one or both of a spoke-detection method or a stroke-detection method, wherein when at least one of the membrane and cytoplasmic structures is associated with a tumor nuclei, the association of at least one of the membrane and cytoplasmic structures and the tumor nuclei is considered a positively stained cell, computing at least one of a membrane and cytoplasmic image intensity feature, and binning the positively stained cell into a category that indicates how the cell is stained. Based on the number of categorized positively stained cells, a slide level clinical score of (0, 1+, 2+, 3+) may be computed.

In one exemplary embodiment, the subject disclosure provides a system for scoring an assay, including a processor and a memory coupled to the processor, the memory to store digitally encoded and/or computer-readable instructions that, when executed by the processor, cause the processor to perform operations including identifying a plurality of nuclei in a portion of an image, and determining whether any surrounding regions of one or more nuclei out of the plurality of nuclei can be associated with a membrane, wherein a positive association of said one or more nuclei with a membrane results in a determination of a positively stained cell.

"Association" as used herein can imply, for example, that the identified membrane lies within a predefined maximum distance from an identified nucleus and/or that the criterion of surrounding or lying within the predefined maximum distance from an identified nucleus is a prerequisite for being identified as a membrane, in particular a cell membrane, of a positively stained cell.

A "positively stained cell" as used herein is, for example, a biomarker-positive tumor cell, i.e., a tumor cell whose membrane and optionally also some cytoplasmic structures comprise the biomarker, whereby the biomarker has been stained with a suitable stain, e.g. DAB. In some embodiments, all cells contained in the tissue section on the slide are considered as tumor cells per default, and in case a membrane comprising the biomarker was identified in the vicinity of an identified nucleus, the combination is considered as a positively stained tumor cell although there may be some few non-tumor cells, e.g. stroma cells, which are also considered as "tumor cells" in this approach. In other embodiments, additional filtering steps are used, e.g. during the identification of nuclei, to filter out nuclei and corresponding cells which are identified as non-tumor cells, e.g. due to the size or shape of the nucleus.

In another exemplary embodiment, the subject disclosure provides a system for scoring an assay, the system including a processor and a memory coupled to the processor, the memory to store computer-readable instructions that, when executed by the processor, cause the processor to perform operations including determining whether or not a structure detected within a range of an identified tumor nuclei in a field of view of an IHC image is associated with a membrane or cytoplasmic feature, wherein when said structure detected is associated with the membrane or cytoplasmic feature, the identified tumor nuclei is considered a positively stained cell, and scoring the IHC image based on a plurality of positively stained cells based on at least one of an intensity feature or a completeness feature.

In yet another exemplary embodiment, the subject disclosure provides a tangible non-transitory computer-readable medium to store computer-readable code that is executed by a processor to perform operations including identifying a number of membrane features within a vicinity of a nucleus identified in an IHC image, wherein the nucleus is identified in a hematoxylin channel deconvolved from the IHC image, and wherein the number of membrane features are identified in a DAB channel deconvolved from said IHC image, and scoring the IHC image based on the number of membrane features identified, wherein the image is binned into one of four categories based on the score.

BRIEF DESCRIPTION OF THE DRAWINGS

In the following embodiments of the invention are explained in greater detail, by way of example only, making reference to the drawings in which.

DETAILED DESCRIPTION

Systems and methods disclosed herein relate to an automated image analysis algorithm and workflow to score digitized slides, having biological specimen or specimens thereon, stained with IHC assays which stain the membranous and cytoplasmic regions. The present invention is described, for exemplary purposes, in connection whole NSCLC slides that are stained with c-MET IHC assay. However, the disclosed operations may be applicable to any other combinations of membranous and cytoplasmic stains and nuclei counterstains as will be evident to persons having ordinary skill in the art in light of this disclosure.

A "counterstain" can be, for example, a stain for staining nuclei. For example, the counterstain can be of a contrasting color in respect to the stain used to color the membrane and cytosolic components comprising the biomarker. According to embodiments, the nuclei are made visible only by the counterstain, not by the stain used for staining the biomarker. According to some embodiments, the counterstain is an example of a "first stain" and the stain for staining the biomarker is an example for a "second stain".

Figure 1:
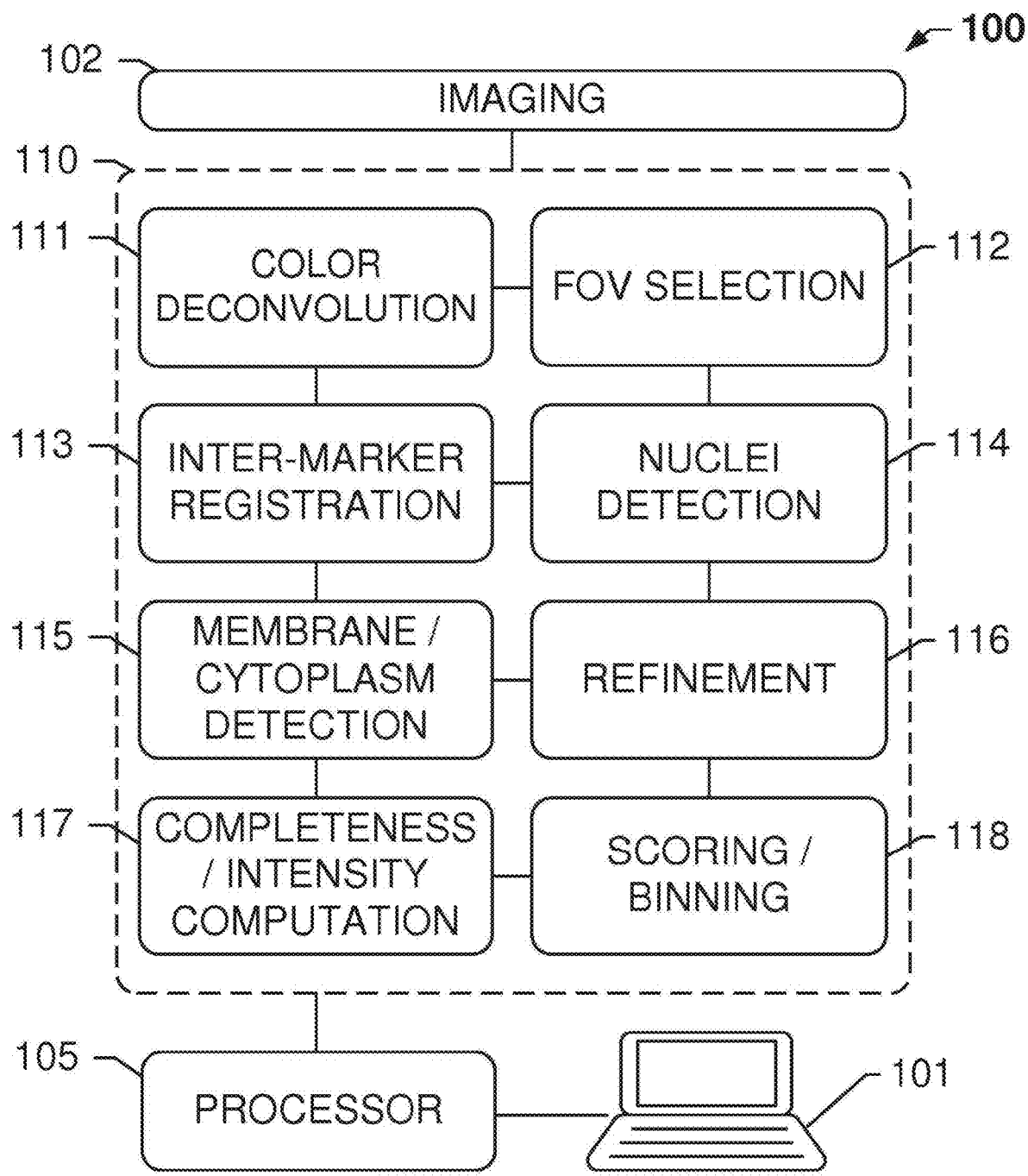
FIG. 1 depicts a system 100 for scoring IHC slides, according to an exemplary embodiment of the subject disclosure.

FIG. 1 depicts a system 100 for scoring IHC slides, according to an exemplary embodiment of the subject disclosure. System 100 comprises a memory 110, which stores a plurality of processing modules or logical instructions that are executed by processor 105 coupled to a computer 101. Execution of one or more of the plurality of processing modules 111-118 may be triggered by receiving image data from imaging subsystem 102. Besides processor 105 and memory 110, computer 101 also includes user input and output devices such as a keyboard, mouse, stylus, and a display/touchscreen. As will be explained in the following discussion, processor 105 executes logical instructions stored on memory 110. Imaging subsystem 102 may include any combination of a staining and/or imaging platform. For instance, the sample may have been stained by means of application of a staining assay containing one or more different biomarkers associated with chromogenic stains for brightfield imaging or fluorophores for fluorescence imaging Staining assays can use chromogenic stains for brightfield imaging, organic fluorophores, quantum dots, or organic fluorophores together with quantum dots for fluorescence imaging, or any other combination of stains, biomarkers, and viewing or imaging devices.

According to embodiments, the first and/or second stain can be a chromogenic stain for brightfield imaging, organic fluorophores, quantum dots, or organic fluorophores together with quantum dots for fluorescence imaging.

Moreover, a typical sample is processed in an automated staining/assay platform that applies a staining assay to the sample, resulting in a stained sample. There are a variety of commercial products on the market suitable for use as the staining/assay platform, one example being the Discovery™ product of the assignee Ventana Medical Systems, Inc.

Imaging subsystem 102 may further include a camera on a microscope or a whole-slide scanner having a microscope and/or imaging components such as the Ventana iScan HT or iScan Coreo scanners, either at 20× or 40× magnification. In one exemplary embodiment, imaging subsystem 102 is used to digitize or scan whole-slide images corresponding to serial sections of a tissue sample from a human patient. The tissue sample may be that of a lung, and the serial tissue sections may be stained with at least a cMET assay, and a hematoxylin and eosin (H&E) assay. To quantify a protein expression, for example, MET expression in both non-neoplastic (non-malignant) and malignant cells, an assay, for example, a c-MET IHC assay has been developed that is directed against the c-MET protein. The assay can be used to select NSCLC patients who may respond favorably to targeted therapeutics. The assay may be utilized on automated staining platforms, for example, BENCHMARK XT and BENCHMARK ULTRA, and/or with DAB detection kits, and is intended for the semi-quantitative detection of an intracellular domain (i.e., cytoplasmic and membrane region) of the c-MET protein, for example, in sections of formalin-fixed, paraffin-embedded (FFPE) tissue (e.g., human tissue) and stains the membranous and cytoplasmic cellular regions. For example, in case DAB is used as the second stain in a c-MET assay, DAB may stain membranous and cytoplasmatic cellular regions in close proximity to the cell membrane, e.g. because the DAB detection kit may cause the DAB to selectively bind to the cytosolic domain of the cell membrane protein c-MET. The method of embedding may vary. The categorization of MET expression in NSCLC is semi-quantitative, and requires evaluation of staining intensity and percentage positivity. For example, the percentage positivity may be the percentage of tumor cells in a tumor tissue section which express the biomarker and which therefore can be detected as "biomarker-positive tumor cell".

Digitized images of whole-slides may be provided via a network or any other communications means. Images may be provided along with information related to which and how many specific antibody molecules bind to certain binding sites or targets on the tissue, such as a tumor marker or a biomarker of specific immune cells, as well as any information related to the staining platform, including a concentration of chemicals used in staining, a reaction times for chemicals applied to the tissue in staining, and/or pre-analytic conditions of the tissue, such as a tissue age, a fixation method, a duration, how the sample was embedded, cut, etc.

Figure 2A:
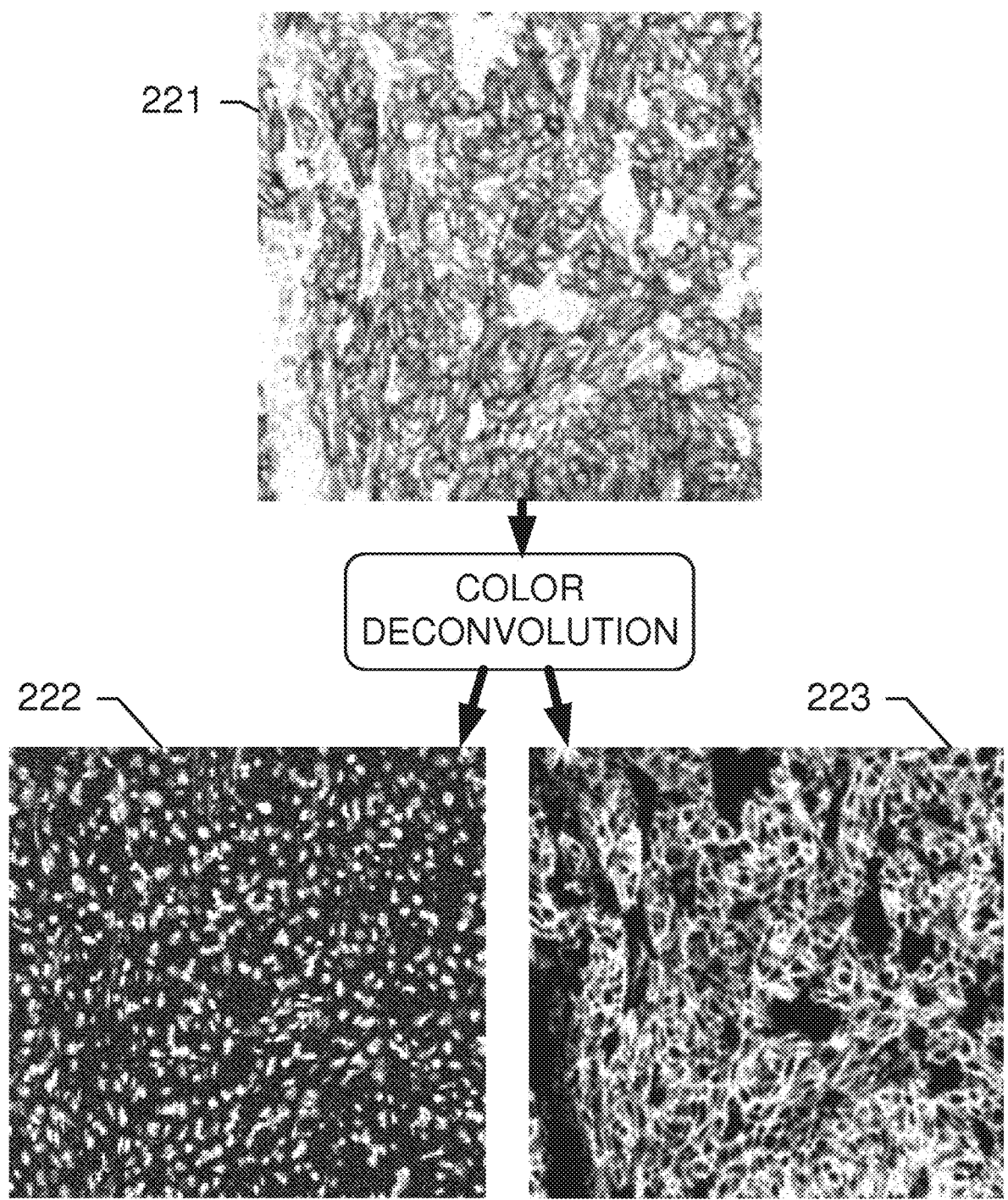
FIG. 2A depicts a whole-slide image 221 that is unmixed or deconvoluted to provide 2 output images, according to an exemplary embodiment of the subject disclosure

An image of one or more assays may be supplied to memory 110 for processing by the module stored thereon. The image may be, for example, an RGB image. A color deconvolution module 111 may be invoked to separate the stain combinations in the image and to provide two or more images that are a linear combination of the two or more stains on the whole slide image received from imaging subsystem 102. See, for example, FIG. 2A, depicting a whole-slide image 221 that is unmixed or deconvoluted to provide 2 output images, respectively representing a DAB (brown) channel 222 (or "DAB channel image" 222), and an H&E (counterstain) channel 223 (or "H&E channel image" 223). According to embodiments, the DAB channel image is an example of a "second digital image" and the H&E channel image is an example for a "first digital image". Although the DAB channel (3,3'-Diaminobenzidine) is typically brown, and other stain/counterstain channels may be of different colors, an RGB image such as whole-slide image 221 may be deconvoluted and each individual color channel represented in a gray-scale version so as to provide a 1-dimensional intensity value between 0-255 for each pixel, as shown in images 222 and 223. In other words, the DAB channel and the H&E channel images need not be depicted in their original colors, and the gray-valued deconvolved images represent the "intensity" or "strength" of the particular stain used.

Either the whole slide can be digitized using a whole slide scanner at the desired magnification of 20/40× or a pathologist can review the slide under a digital microscope and select regions for image analysis and capture only those regions. According to some embodiments, the area of the slide that is covered by the first and second digital image may be the whole slide or may be the totality of all regions selected by the pathologist. It is also possible that a tumor tissue detection algorithm automatically selects said regions to be inspected via image analysis. An FOV selection module 112 provides an interface to select fields of view (FOVs) for further analysis, as further described herein. Briefly, any image analysis operations described herein may be performed on a whole-tumor region of the input image or on specific regions (FOVs) highlighted by a trained pathologist or other operator. The digitized slide, for example whole slide, is saved in a memory or storage device, for example, either to a local image folder or on a remote image server, and is opened from the memory or storage device, and reviewed in a viewer, for example, a whole slide viewer (like Virtuoso, Image Viewer or Verso, for example) and/or slide management application. Based upon a careful navigation and review of the whole slide at different magnifications, the pathologist or a qualified expert annotates enough number of representative tumor regions (fields of views, FOVs) on the digitized whole slide for interpretation and scoring. The annotated representative fields are selected to reflect the marker expression that the pathologist would use for overall slide interpretation. The annotations are drawn using the annotation tools provided in the viewer application. The annotations can be drawn at any particular magnification (resolution).

The annotations may be assigned to an H&E image of a second slide, i.e. a slide comprising a tumor tissue section having been stained with hematoxylin and eosin ("H&E). The annotations of said H&E image may be mapped and transferred to the first and/or second digital image having been derived from an area of another slide ("first slide"). The other slide comprises a tumor tissue section having been stained with the first and second stain, e.g. with hematoxylin and DAB. To allow the mapping the tumor tissue sections of the first and second slides have to be adjacent serial tissue sections.

Figure 2B:
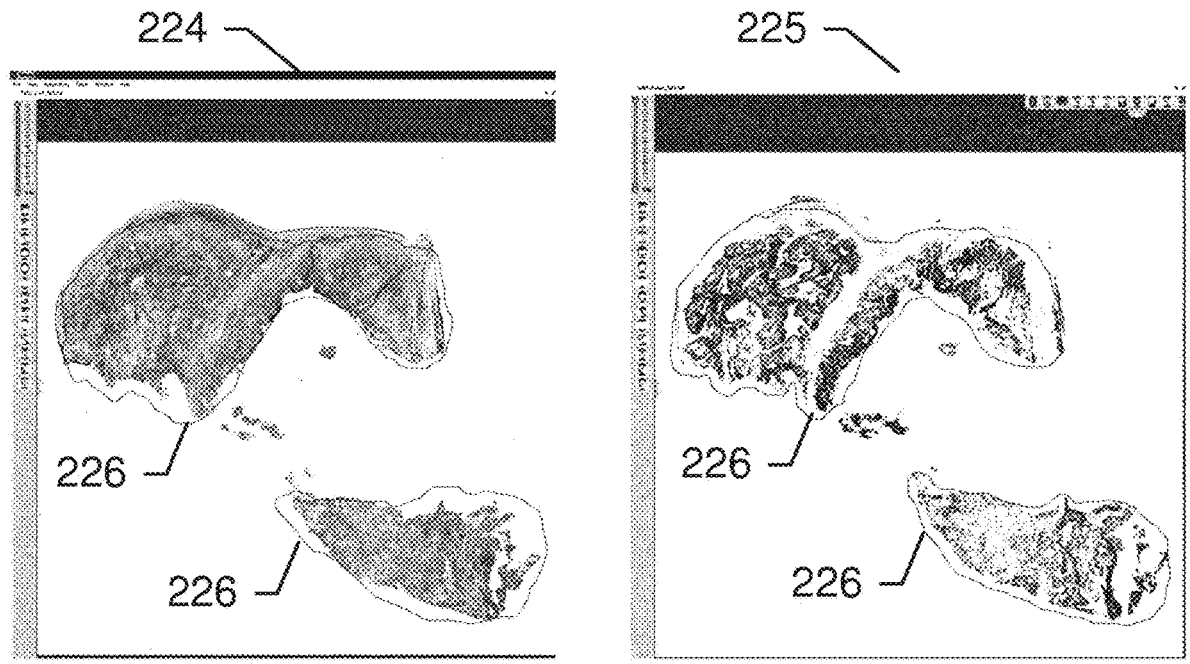
FIGS. 2B-C depict different FOV selections, according to an exemplary embodiment of the subject disclosure.
Figure 2C:
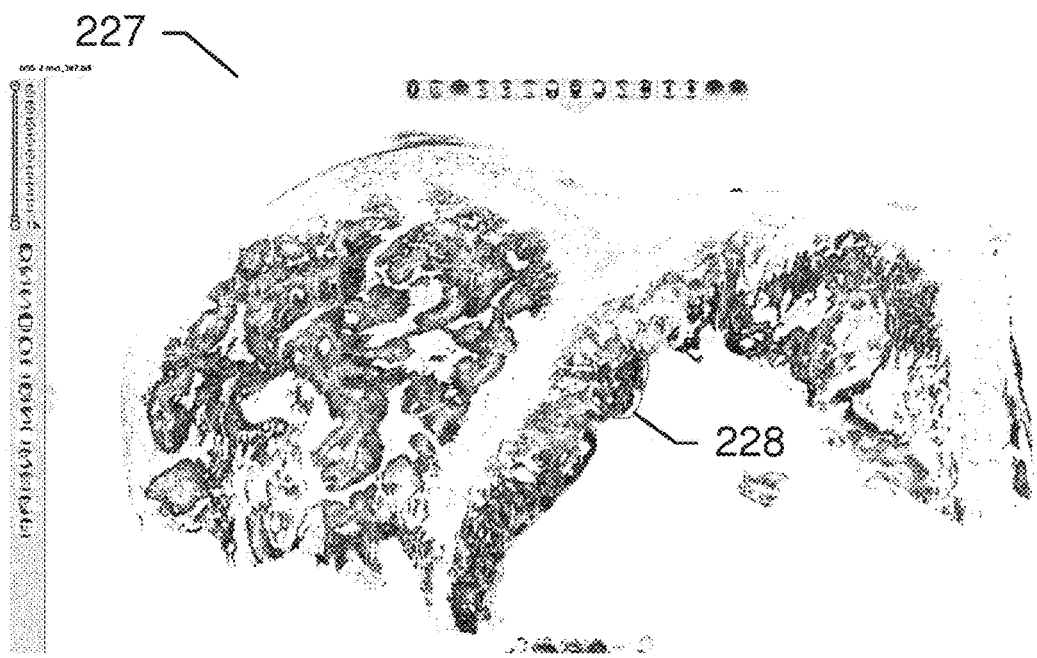

For example, FIGS. 2B and 2C depict the different FOV selections. FIG. 2B depicts a whole-tumor FOV selection 226 annotated on an H&E image 224, wherein an inter-marker registration operation is used to transfer the annotation 226 of the whole-tumor onto a cMET image 225 corresponding to a serial section of the same tissue sample. In other words, the annotation 226 is performed on H&E image 224, either by a pathologist or using automated image-analysis operations such as segmenting, thresholding, edge-detection, etc., and the annotation 226 is automatically mapped to the corresponding regions of the cMET image 225. Only the annotated region 226 is analyzed and scored per the operations described herein.

In an alternate embodiment depicted in FIG. 2C, specific regions 228 of a cMET image 227 are selected by a trained pathologist or other operator for analysis. The inter-marker registration operation may not be needed since the annotations 228 are drawn on the cMET image itself. The cMET image is an image, e.g. an RGB image, of the area of the first slide. The cMET image may be subsequently unmixed or deconvoluted to generate the first and second digital images which are used to generate the score, as further described herein. Therefore, deconvolution module 111 and FOV selection module 112 need not be executed in any particular order, and one module may call another when needed.

The field of view may be registered or transferred from the H&E image to one or more adjacent images, such as a cMET image. For example, registration operations across assays with different combinations of stains and markers use an inter-marker algorithm, such as methods further described with reference to commonly-assigned and co-pending EP patent application WO2014140070A2, the contents of which are hereby incorporated herein by reference in their entirety. Relevant sections of the incorporated patent application describe a digital image registration process comprising selecting a first digital image of a first tissue section from a set of digital images of adjacent tissue sections of a single patient, selecting a second digital image of a second tissue section from the set, matching tissue structure between the first digital image and the second digital image, and automatically mapping an annotation drawn on the first digital image to the second digital image.

The first digital image may be derived from an image obtained using a stain and an imaging mode, and the second digital image may be derived from an image obtained using a different stain, a different imaging mode, or both as compared to the first digital image. The stain, e.g. the first and/or second stain, may be chosen from a hematoxylin and eosin stain ('H&E' stain), an immunohistochemistry stain ('IHC' stain), or a fluorescent stain. For example, the first stain used for staining the nuclei can be hematoxylin and the second stain used for staining the biomarker can be DAB. The imaging mode may be chosen from brightfield microscopy or fluorescent microscopy. A matching tissue structure may comprise a coarse registration mode comprising: generating a first gray-level tissue foreground image from a digital image and generating a second gray-level tissue foreground image from another digital image; computing a first tissue binary edge map from the first gray-level tissue foreground image and computing a second tissue binary edge map from the second gray-level tissue foreground image, computing global transformation parameters to align the first binary edge map and the second binary edge map, and, mapping the first digital image and the second digital image to a common big grid encompassing both the digital images from which the first and the second gray-level tissue foreground images were generated based on the global transformation parameters. For example, the digital image from which the first gray-level tissue foreground image was generated may be a digital image of the first slide and is in the following referred to as "first slide digital image". The other digital image may be a digital image of the second slide and is in the following referred to as "second slide digital image". Computing global transformation parameters may further comprise using a moments-based mapping method to generate an affine mapping between the first binary edge map and the second binary edge map. A fine registration mode may be used to refine alignment of the first digital image and the second digital image. The fine registration mode comprises: annotating the digital image from which the first gray-level tissue foreground image was generated, mapping the annotation on the common big grid to a corresponding location in the digital image from which the second gray-level tissue foreground image was generated, and updating the location using Chamfer-distance matching based on the binary tissue edge maps. Cropped versions of the tissue edge binary maps may be used and the method may further comprise selecting a minimum cost window which improves matching relative to coarse mode registration.

Chamfer distance matching allows finding the best fit of edge points from two different images by minimizing a generalized distance between them. The edge points of one image are transformed by a set of parametric transformation equations that describes how the image can be geometrically distorted in relation to one another. Applying chamfer distance matching may be beneficial as the method has been observed to be fast and to be able to deal with imperfect input data.

Upon designating a field of view and registering the field of view across images, a nuclei detection module 114 may be invoked to count the number of tumor cells, for instance in a hematoxylin channel image (which may be an example for a "first digital image"), that is unmixed or deconvolved from the RGB whole-slide image. Nuclei detection may use any known nuclei detection method, such as segmenting, thresholding, etc. In one exemplary embodiment, a radial symmetry based nuclei detection operation is used. Radial symmetry operations are further described in commonly-assigned and co-pending patent application WO2014140085A1. These operations may include automatically interpreting and scoring tissue specimen slides, for example, specimens stained with an immunohistochemical (IHC) assay. A region of an image or an entire image (e.g., a digital whole-slide image) may be analyzed based at least in part on information and characteristics associated with the whole slide and features selected for quantitative analysis. A whole slide image is considered an image of all or substantially all of the tissue containing regions (e.g., all regions of the slide excluding labels, markers, and blank areas) of a slide. Cellular structures (e.g., nuclear objects, nuclei seed and/or membranes) and cells in a region of a slide (e.g., a particular tissue region of the slide) or the whole slide may be identified based at least in part on information pertaining to data associated with tissue containing regions of the slide. Said "region" is also referred to as "area". Cells may be counted and various types of local and global features of these cells computed to identify the cell types and perform quantitative analysis. The feature computation can use information from not only an annotated region of a slide but also information from the whole slide (e.g., tissue-containing regions of the slide analyzed at multiple magnifications).

Cells may be automatically counted and classified to score the image and/or entire slide based at least in part on selected fields of view and/or the whole slide based at least in part on information or data associated with the whole slide (i.e., all of the tissue containing regions of the slide). The score can be used for slide interpretation.

According to one example, the system can accurately count identified nuclear objects and/or nuclei to determine information about the tissue to assist with reliable and reproducible slide interpretation. In one embodiment, the system counts identified nuclei contained within identified biomarker-positive tumor cells and/or negatively-stained identified nuclear objects and/or nuclei contained within identified biomarker-positive cells which have been identified as non-tumor cells to score, for example, a biological specimen (e.g., tumor tissue). In some embodiments, an overlay image is produced to label features of interest in the image of a specimen from a subject.

According to another example, the system can accurately count nuclear objects to determine information about the tissue to assist with reliable and reproducible slide interpretation. In one embodiment, the system counts positively-stained nuclear objects and/or negatively-stained nuclear objects to score, for example, a biological specimen (e.g., tumor tissue). In some embodiments, an overlay image is produced to label features of interest in the image of a specimen from a subject.

Scoring of the tissue may be performed to predict and/or generate a prognosis for the tissue sample. In some embodiments, a pathologist can approve or reject a slide score. If the slide score is rejected, the automated score can be replaced with a manual score (e.g., a score based at least in part on visual inspection). The system can have a classifier that was trained based at least in part on a set of training or reference slides for each marker, for example biomarker. The set of training slides for a marker can represent all desired data variability. Different sets of slides can be used to train a classifier for each biomarker. Accordingly, for a single biomarker, a single classifier is obtained after training. Since there is variability between the image data obtained from different biomarkers, a different classifier can be trained for each different biomarker so as to ensure better performance on unseen test data, where the biomarker type of the test data will be known. The trained classifier can be selected based at least in part on how best to handle training data variability, for example, in tissue type, staining protocol, and other features of interest, for slide interpretation.

The system can analyze a specific region of an image based at least in part on information within that region, as well as information outside of that region. In some embodiments, a multi-stage binary classifier can identify nuclei of biomarker-positive tumor cells and nuclei of biomarker-positive non-tumor cells (e.g. lymphocytes and stroma cells). The nuclei of biomarker-positive non-tumor cells are filtered out from the totality of the identified nuclei and in a further refinement step, only the positional information of the remaining identified nuclei are analyzed together with the second digital image for identifying the cell membranes. In case an identified cell membrane surrounds a nucleus having been filtered out as being a nucleus of a biomarker-positive non-tumor cell, said cell membrane is filtered out from the totality of identified cell membranes, and the totality of identified biomarker-positive tumor cells is updated accordingly. According to some embodiments, in further classification, the biomarker-positive tumor cells can be distinguished from background cells, i.e., cells having a very weak nuclear blob intensity which may be caused by said cells belonging to a background layer in the first slide. For example, biomarker-positive tumor cells having a brown stained nuclei with intensity values equal to or above a minimum threshold level may be kept as biomarker-positive tumor cells. Biomarker-positive tumor cells having a brown stained nuclei with intensity values below said minimum threshold level may be identified as background cells or cytoplasmic blush. The identified background cells and the cytoplasmatic blush are filtered out in a succeeding step. Based at least in part on the number of biomarker-positive tumor cells/biomarker-positive non tumor cells, a score (e.g., a whole-slide score) can be determined. According to embodiments, in order to identify the nuclei, at first nuclear blobs are identified by analyzing intensity values in the first digital image. For each detected nuclear blob, average blob intensity, color and geometric features, such as area and shape of the detected nuclear blob may be computed, and the nuclear blobs are classified into tumor nuclei and nuclei of non-tumor cells, e.g., stromal and lymphocyte cells. The nuclear blobs based on which nuclei of stromal and lymphocytes cells were identified may be excluded from later steps in the process. Thus, the totality of identified nuclei may not comprise the nuclei of non-tumor cells from the beginning or the nuclei of non-tumor cells may be removed from the totality of identified nuclei in a later step. The number of identified nuclei output by this module corresponds to the total number of biomarker-positive tumor cells detected in the FOV, as evidenced by the number of tumor nuclei counted. The total number of tumor nuclei used for whole slide scoring is an aggregate of the count of detected tumor nuclei in all the analyzed regions.

According to further embodiments, the system can analyze a specific region of an image based at least in part on information within that region, as well as information outside of that region. In some embodiments, a multi-stage binary classifier can identify positive and negative nuclei. The positive nuclei can be distinguished from the negative nuclei, lymphocytes, and stroma. Additionally, the negative cells and lymphocytes can be distinguished from stroma. Lymphocytes are then distinguished from the negative nuclei. In further classification, the positive cells can be distinguished from background cells. For example, if the positive cells have brown stained nuclei, the background cells may be cytoplasmic blush that can be filtered out. Based at least in part on the number of positive/negative nuclei, a score (e.g., a whole-slide score) can be determined. In summary, for each detected nuclei, average blob intensity, color and geometric features, such as area and shape of the detected blob may be computed, and the blobs are classified into tumor nuclei, stromal and lymphocyte cells. The stromal and lymphocytes cells may be excluded from later steps in the process. The number of cells output by this module corresponds to the total number of tumor detected in the FOV, as evidenced by the number of tumor nuclei counted. The total number of tumor nuclei used for whole slide scoring is an aggregate of the count of detected tumor nuclei in all the analyzed regions.

Figure 2D:
FIG. 2D depicts a plurality of detected nuclei in an IHC image, according to an exemplary embodiment of the subject disclosure.

FIG. 2D depicts a plurality of nuclei in an IHC image that were detected using the above-described radial symmetry detection operations.

Figure 3A:
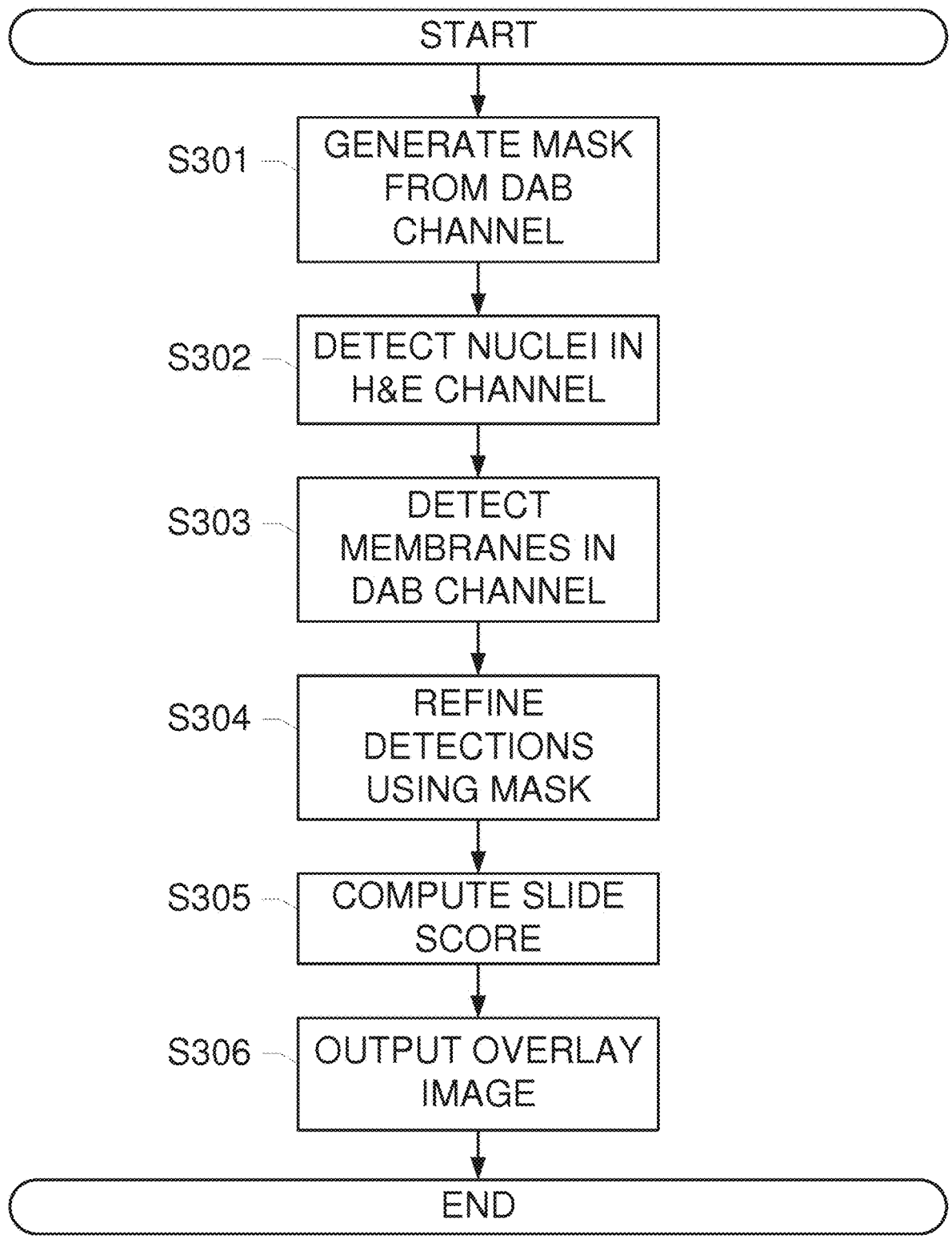
FIGS. 3A-3C depict a method for scoring an image of an assay, according to an exemplary embodiment of the subject disclosure

Referring back to FIG. 1, a membrane or cytoplasm detection module 115 may also be executed to find strokes corresponding to cell membranes. The "cytoplasm detection" relates, for example, to the detection of cytoplasmatic domains of cell membrane proteins. Operations performed by membrane detection module 115 are further described with respect to FIGS. 3A-3B. Generally, cell membrane detection is performed on the DAB (3,3'-Diaminobenzidine) channel, and enabled by a crude mask, also referred herein as "binary refinement mask", generated via an Otsu segmentation (that is known in the art) on the DAB channel that identifies membranous regions on which membrane detection is performed. In other words, membrane detection is based on image thresholding the DAB channel and using a spoke or a stroke model to detect membranous structures. In alternate embodiments, instead of the DAB channel, membrane detection may be performed on the inverted version of the red channel in the input RGB image, or on any other estimate of the brown channel image. The brown channel image can be an example of a "second digital image".

A refinement module 116 performs correlation operations on the results of the nuclei and cell membrane detections along with the mask to determine viability of results. The module filters false detections based on whether or not a cell membrane encloses a nucleus counterstain, or when a counterstain is enclosed by a cell membrane. These operations may be based on an overlay of the output images from detection modules 114 and 115, i.e., on an overlay or "mapping" of the first and second digital image. For example, centers of nuclear blobs (for example, homogeneous intensity regions in the first digital image acting as nuclei candidates and being analyzed in order to identify the nuclei) are mapped to corresponding regions of the second digital image. Vectors radiating out from said mapped centers of nuclear blobs in the second digital image in 8 or more directions may be applied to search for cell membrane regions around the detected nuclei.

According to embodiments, the brown mask, i.e., the binary refinement mask, also helps clear out empty regions, i.e. regions without any nuclei or cell membranes. Refinement operations further include morphological operations to eliminate spurious nuclear detections. Refinement module outputs a refined membrane/cytoplasmic detection mask, which can, for example, act as a refined and improved binary refinement mask, as further described in FIGS. 4A-4B.

Subsequently, completeness and intensity computation module 117 and scoring/binning module 118 are invoked to determine how completely circumferential or how well-enclosed each detected ("identified") nucleus is, and the intensity of detection results, in order to score the field of view and/or the image. The field of view and/or the image may be, for example, the area of the slide from which the first and second digital image were derived. The scores may be subject to thresholds that enable binning each image into a category representing zero, weak, moderate, and strong, as further described herein. These scores and categories are based on percentages of complete circumferences and intensities of the detection results. The output from these modules provides a results image depicting completely and partially stained nuclei and membranes.

As described above, the modules include logic that is executed by processor 105. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 210 that, in an exemplary embodiment, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. Each module may call another module when needed to be executed.

FIG. 3 depicts a method for scoring an image of an assay, according to an exemplary embodiment of the subject disclosure. The operations described in this exemplary embodiment may use components described with reference to system 100, or other components that perform similar functions. For example, an imaging subsystem may be used to digitize or scan whole-slide images corresponding to serial sections of a tissue sample from a human patient. The tissue sample may be that of a lung, and the serial tissue sections may be stained with at least a cMET assay, and a hematoxylin and eosin (H&E) assay. For example, the cMET assay may be used for staining the MET protein biomarker with a second stain, e.g. DAB, and the hematoxylin and eosin (H&E) assay may be used for staining the nuclei with a first stain, hematoxylin. An image of one or more slides (any of which may be, for example, referred to as "first slide") may be supplied to an unmixing or color deconvolution module, resulting in two separate images respectively depicting: a DAB (brown stain) channel image, and a first digital image, also referred to as an H&E (counterstain) channel image, as depicted in FIG. 2A. The DAB (brown stain) channel image can be considered as an example of a second digital image and the H&E (counterstain) channel image can be considered as an example of the first digital image.

Either the whole slide can be digitized using a whole slide scanner at the desired magnification of 20/40× or a pathologist can review the slide under a digital microscope and select regions for image analysis and capture only those regions. Fields of view may be selected, such as a whole-tumor section or specific sections and registered using registration algorithms. The fields of view may be selected from a further image of a second slide stained e.g. with a combination of hematoxylin and eosin, whereby the second slide comprises a tumor tissue section that is an adjacent serial section of the tumor tissue section of the first slide. The further image of the second slide and the original image and/or the first and/or second digital image of the first slide may be mapped to each other and registered using registration algorithms. The registration algorithms are performed for transferring annotations from the further image of the second slide to the original RGB image and/or the first and second digital image of the first slide. The same method is applicable independent of whether the annotations are from whole tumor annotations or FoV annotations.

In either case, the method may begin with generation of a mask (S301), or a "binary mask image" or "binary refinement mask", from the DAB channel image where the membranous and cytoplasmic region is set to true and all everywhere else false. A low threshold value, selected from a set of training examples, may be used to segment the DAB channel. All pixels with intensity value above the threshold are set to true and otherwise false.

For example, in the mask, regions in the second digital image whose intensity values are above a dynamically determined threshold are set to true, meaning that the pixel does not become a "mask pixel". Setting a pixel to false means that said pixel becomes a "mask pixel". The regions of high intensity typically correspond to the membranous and cytoplasmic regions next to the cell membrane where the biomarker is located and stained with the second stain.

To remove false detections (i.e., falsely detected cells), due to staining artifacts, a simple 3×3 pixel median filter is used, e.g. at an image resolution where 3 pixel correspond to 1 μm in the slide, but the filter size may vary. Morphological image operators may be used to eliminate any small holes smaller than the nuclei size. The DAB intensity image is masked out using the binary refinement mask. Thereby, for example, a refined image can be created from the combination of the second digital image or a derivative thereof, e.g. the intermediate image mentioned above, and the digital refinement mask. The refined image is a refined version of the second digital image in which several regions of higher intensity are masked because it is impossible or unlikely that they relate to cell membranes of biomarker-positive tumor cells.

According to embodiments, nuclei detection (S302) includes counting the number of tumor cells in the H&E channel using any known nuclei detection method. In exemplary embodiments, a radial symmetry based nuclei detection operation may be used. For the detected nuclei, average blob intensity, color and geometric features, such as area and shape of the detected blob are computed, and the blobs classified into tumor nuclei, stromal and lymphocyte cells. The stromal and lymphocytes cells may be excluded from later steps in the algorithm, and all the nuclei seeds which fall outside of the binary mask of step (S301) are excluded from further image analysis.

According to some further embodiments, nuclei detection (S302) includes counting the number of tumor cells in the H&E channel image, e.g., the first digital image, using any known nuclei detection method. In exemplary embodiments, a radial symmetry based nuclei detection operation may be used. For example, nuclear blobs can be identified in a first step. For each detected nuclear blob and/or each detected nucleus, average blob intensity, color and geometric features, such as area and shape of the detected nuclear blob are computed, and the nuclear blobs classified into tumor nuclei and nuclei of non-tumor cells, e.g. nuclei of stromal cells and lymphocyte cells. The nuclei of non-tumor cells, e.g. of stromal and lymphocytes cells, may be excluded from later steps in the algorithm. In addition, all the identified nuclei and/or nuclear seeds which fall outside of the binary mask of step (S301), i.e., which are masked by the mask pixels of the binary refinement mask, are not considered as identified nuclei and are excluded from further image analysis.

Figure 3B:
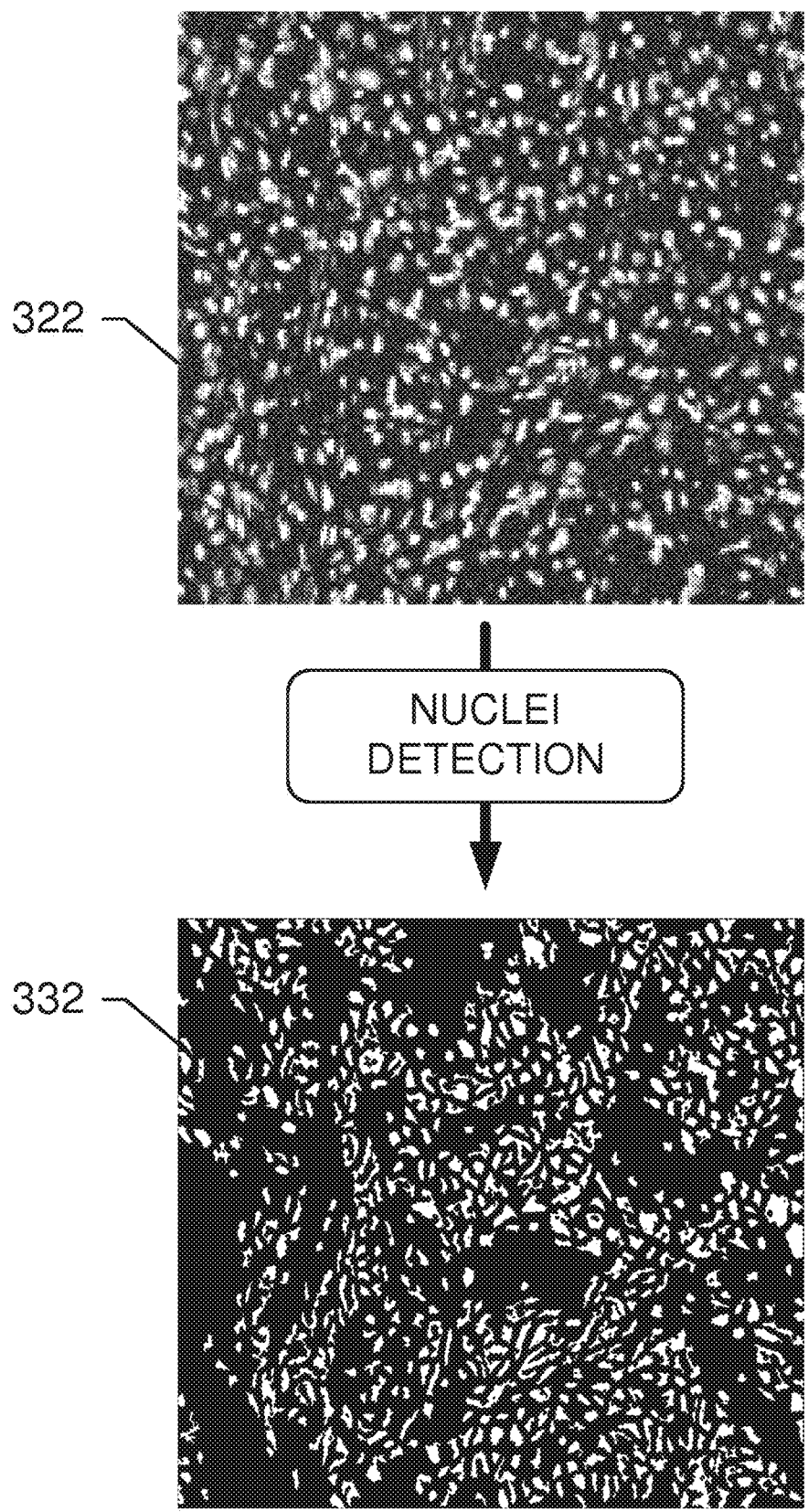

FIG. 3B depicts results of nuclei detection from an H&E channel image 322 to an image depicting results 332 of nuclei detection.

Membrane detection (S303) detects the DAB-stained, MET marker positive membrane and cytoplasmic compartments of each cell. Membrane detection (S303) includes detecting membrane strokes within pixels around selected pixels in the DAB channel, as further described with respect to FIGS. 4A-4C. Membranous and cytoplasmic structures comprising the biomarker are detected in the positive stain channel image (e.g., the "DAB channel image" or another example of a "second digital image").). Exemplary embodiments of this method are based on image thresholding the DAB channel as in step (S301) and using a spoke model or a stroke model to detect membranous structures and cytoplasmic regions for any positively stained cell. This operation further comprises associating the detected nuclei in the Hematoxylin channel image (which may be an example for a "first digital image") (S302) with the surrounding membranous and cytoplasmic detections, in order to associate the identified nuclei with a cell. For example, this stem may comprise associating the detected nuclei in the first digital image with any identified cell membranes including cytosolic domains of membrane proteins stained with the second stain, in order to associate the identified nuclei with a cell membrane and thus identify a biomarker-positive tumor cell.

Figure 4A:
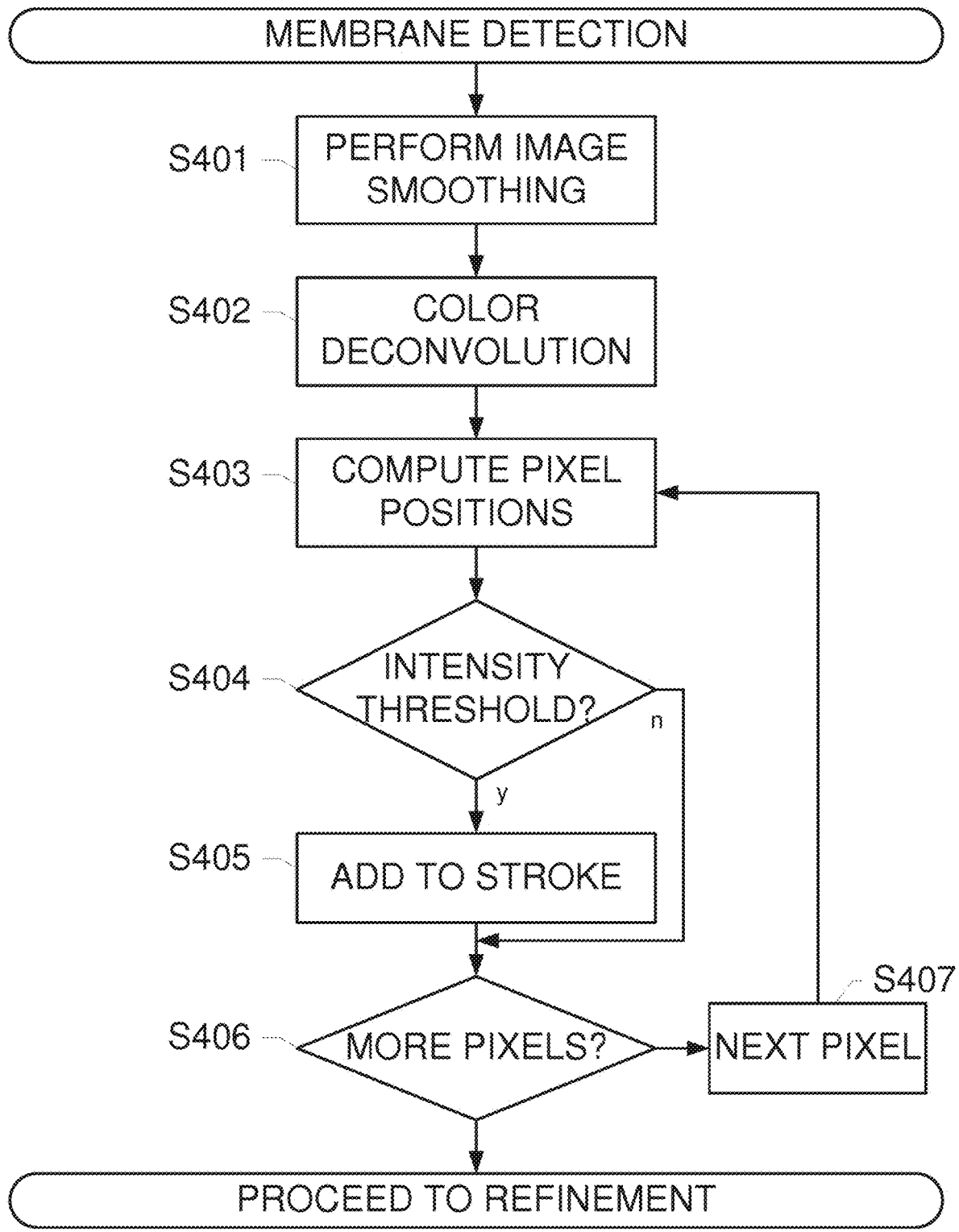
FIGS. 4A-4C depict a method for membrane detection and results of said method, according to an exemplary embodiment of the subject disclosure.
Figure 4B:
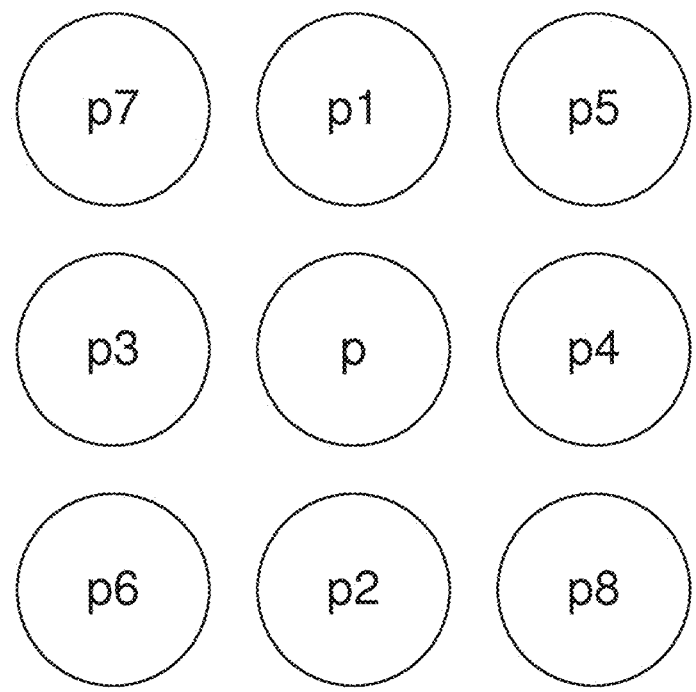
Figure 4C:
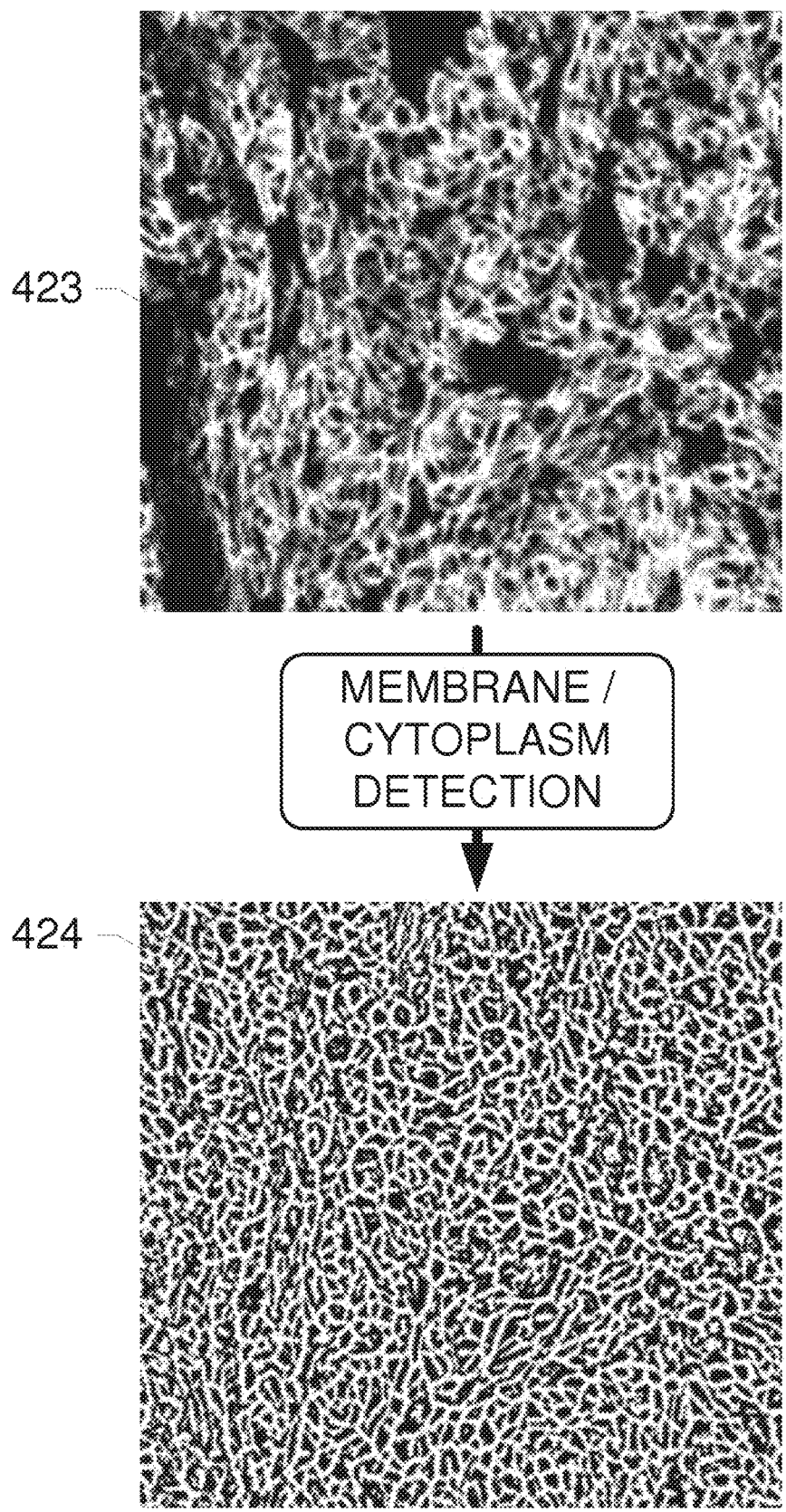

The stroke-based membrane detection method followed with a marker-based watershed segmentation algorithm, as further described with respect to FIGS. 4A-4C, includes detecting membrane strokes in the DAB channel by picking up local maxima in the image, and using a watershed marker-based approach to associate the detected nuclei seeds with the surrounding membranous and cytoplasmic region detections.

For example, the stroke-based membrane detection method followed with a marker-based watershed segmentation algorithm includes detecting cell membrane strokes in the DAB channel image (second digital image) by picking up local maxima in said second image, mapping the identified nuclei in the first digital image to the second digital image, the identified nuclei being used as watershed-markers, and using a marker-based watershed image segmentation approach to associate the detected (or "identified") nuclei with local topological minima of a watershed topology generated from the second digital image and for identifying watershed lines representing the surrounding membranous and cytoplasmic regions of the cell membrane that shall be identified. Depending on the embodiment, the marker-based watershed segmentation algorithm is directly applied on the original second digital image or, more preferably, is applied on a refined version of the second digital image (created with the binary refinement mask). In addition, the original second digital image or the refined version of the digital image may be smoothed by a smoothing algorithm before the marker-based watershed-algorithm is applied.

Figure 3C:
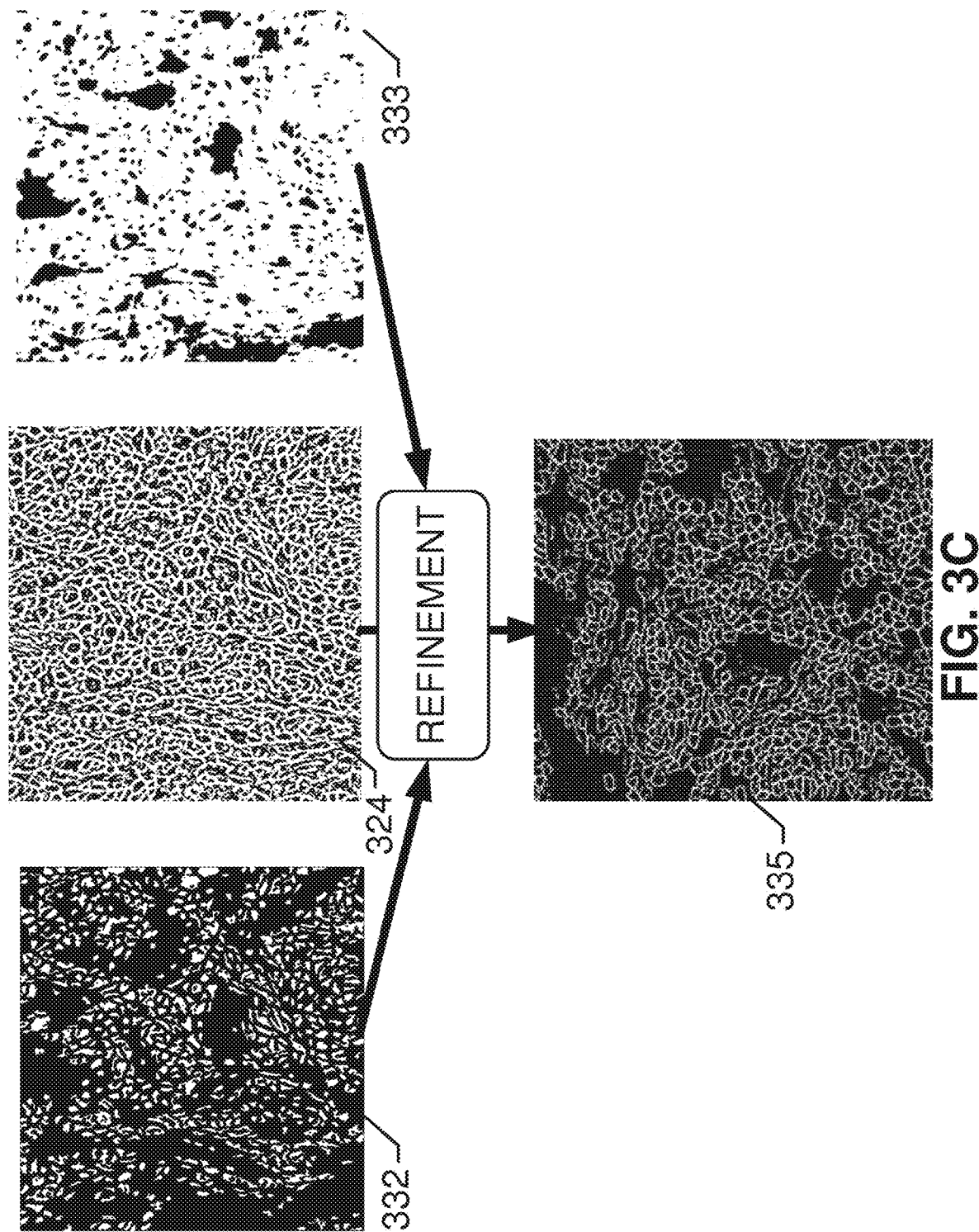

Thus, the watershed marker-based approach may be part of refinement operations (S304) that include using the nuclei seeds detected in step (S302) as the markers, and refining the membrane stroke image (as depicted in FIG. 4C) and segmenting it into different cells and outputting a final cell membrane detection mask as illustrated in FIG. 3C.

According to some embodiments, for the closed blob regions in the binary mask, which do not enclose any nuclei seeds, the geometrical center of the blobs are added as additional seeds.

According to some other embodiments, for the closed blob regions (for example, the area within identified cell membranes) in the binary refinement mask which do not enclose any nuclei seeds and/or do not enclose any identified and mapped nuclei, the geometrical center of the blobs (which may be, for example the geometric center of the identified cell membranes in the binary refinement mask) are added as additional nuclei seeds. For example, an additional seed is an additionally identified nucleus that is added to the totality of already identified nuclei.

Refining (S304) includes segmenting and outputting a pseudo-colored overlay image with cell membrane and nuclei detections that may be scored (S305). Refinement operations (S304) may filter false detections based on a combination of an overlay of the output images from the detection operations, and using the brown mask ("binary refinement mask") to clear out empty regions from the second digital image.

FIG. 3C depicts input images 324 (membrane stroke detected image, e.g. a digital image comprising cell membranes having been identified via a membrane stroke detection approach), 332 (a digital image comprising the detected, i.e., identified, nuclei), and 333 (DAB mask—"binary refinement mask") being used as input into a refinement operation, resulting in an output of a refined digital image 335, which may also be referred to as "refined membrane/cytoplasmatic mask". The refined digital image 335 is generated by remove pixels from the membrane stroke image 324 that are not part of identified nuclei or nuclear objects or which do not enclose an identified nucleus or nuclear object. This is enabled by finding the center of the nucleus, and using the maximum radius input parameter to search for all cell membrane pixels around the center of nuclei. The search is carried out from 0 to 360 degree angle in a circular fashion and going out radially from minimum to maximum radius Thinning operations may be on the strokes-detection based cell membrane image 324 based on mask 333 to result in the final image 335 with detected cell membranes.

The resulting refined membrane image 335 is analyzed using slide score computation operations (S305) that include computing a completeness and intensity of the detected results, in particular, the detected cell membranes, and binning the score into one or more score categories based on thresholds.

For example, once the marker positive (MET positive in this case, HER2 positive in HER2 stained slides) tumor cells are identified in the earlier step, for each cell—the circumferential percentage of the membrane/cytoplasmic staining is computed, along with the average DAB intensity of the staining and all the counter stained tumor cell detections. For example, for each tumor cell—the circumferential percentage of the membrane/cytoplasmic staining is computed, along with the average DAB intensity of the staining and all the counter stained tumor cell detections. This may be implemented, for example, such that for each tumor cell— the circumferential percentage of the pixels contained within a circumferential pixel belt centered along the identified cell membrane are computed, along with the average DAB intensity of the staining of all pixels in said belt and all the counter stained tumor cell detections. Based on the detections and the membrane completeness and intensity measures for each cell, a slide score is computed (S305) based on specific marker interpretation guidelines. Specific marker interpretation guidelines may be specific for the kind of biomarker and/or stains used.

For each tumor cell, the median or an approximate median (or any statistical measure, for example, mean or median) of the pixel intensities in the DAB channel in the membranous and cytoplasmic region Two different scoring attributes, for example, are computed for each tumor cell: Membrane completeness, and membrane intensity. According to embodiments, the calculation is performed selectively for each biomarker-positive tumor cells and biomarker-negative tumor cells are immediately assigned a score being indicative of an incomplete or absent cell membrane and/or a score being indicative of a "No stain" intensity value.

Membrane Completeness Score

Membrane Completeness measures the amount of membranous region around the circumferential region around the nuclei region that is positively stained and is assigned one of these three possible ordinal labels, ("Complete", "Partially Complete", "None") based on two thresholds on circumferential fill.

For example, for each cell, in particular, for each identified biomarker-positive tumor cell, the median or an approximate median (or any statistical measure, for example, mean or median) of the pixel intensities in the DAB channel image in the belt of pixels centered along the identified cell membrane is calculated.

In a next step, an intensity threshold for said identified biomarker-positive tumor cell is calculated in dependence on said median. For example, the cell-specific intensity threshold may be 50% of the light intensity of the median (or other used statistical measure).

Then, two different scoring attributes are computed for each identified biomarker-positive tumor cell: Membrane completeness, and membrane intensity.

Membrane Completeness may measure the fraction of pixels within a belt of pixels having a higher intensity than the intensity threshold having been calculated for said cell based on the median intensity value as described before. The belt of pixels surrounds the identified nucleus of said identified biomarker-positive cell and is centered along the identified cell membrane surrounding said identified nucleus. The higher the amount of the DAB-stained biomarker in the identified cell membrane, the higher the intensity values of the pixels within said belt of pixels. Each identified biomarker-positive tumor cell is assigned one of these three possible ordinal labels, ("Complete", "Partially Complete", "None") based on two thresholds on circumferential fill. The scoring may use the following logic:
  If the percentage ("fraction") of circumferential Fill>"CompleteThreshold", then Completeness="Complete";
  Else if percentage of circumferential Fill>"Partial CompleteThreshold", then Completeness="Partial"
  Else Completeness="None".

The "percentage ("fraction") of circumferential Fill" is the fraction of belt pixels whose intensity value exceeds the cell-specific intensity threshold (of e.g. 50%) of the median intensity value of said cell's pixel belt.

Exemplary threshold values used in one implementation are: CompleteThreshold=80%, Partial-Threshold=20%.

Membrane Intensity Score

Membrane intensity is the measure of positive marker staining in the membrane and cytoplasmic region of the tumor cell and is computed by averaging the positive marker intensity value (DAB pixel values, on a scale of 0 to 255) and using three intensity thresholds—strong, medium and weak—based on which the membrane intensity is binned For example, membrane intensity can be calculated as the measure of positive biomarker staining in the cell membrane and cytoplasmic regions of cell membrane proteins. The membrane intensity score ("Membrane Intensity") is computed by averaging the positive biomarker intensity value (DAB image pixel values, e.g. on a scale of 0 to 255) of all pixels contained in a belt of pixels that surrounds the nucleus of said cell ant that is centered along the identified cell membrane of said cell. Preferentially, the width of the pixel belt is chosen such that it covers also cytosolic domains of membrane proteins. For example, the belt of pixels may cover 1 µm on the slide. For example, in some image resolutions, the belt may be 3 pixels wide. The averaged intensity value calculated for each of said identified biomarker-positive tumor cells is binned ("categorized") in dependence on three intensity thresholds—strong, medium and weak—into one of these four possible categories—Strong, Intermediate, Weak or No Stain. Membrane intensity score determinations may use the following logic:
  If (Membrane Intensity>Strong Intensity Threshold), then MembraneIntensity=Strong
  Else if (Membrane Intensity>IntermediateIntensityThreshold), then MembraneIntensity=Intermediate;
  Else if (Membrane Intensity>WeakIntensityThreshold), then MembraneIntensity=Weak;
  Else MembraneIntensity=No Stain;

In an exemplary implementation, based on the stain and tissue variability observed in training datasets, these threshold values used are: StrongIntensityThreshold=150; IntermediateIntensityThreshold=75; WeakIntensityThreshold=30.

The scoring guideline is specific to c-MET scoring in NSCLC tissue slides, i.e., in case the biomarker is c-MET and the cancer type that is to be evaluated is NSCLC. In other tissue types for the same biomarker or other biomarkers (HER2, EGFR) for various tissue types the scoring guideline are different. Table 1 shows scoring guidelines, per exemplary embodiments of the subject disclosure.

According to some embodiments, the totality of tumor cells in the examined area of the first slide is determined. The totality of tumor cells includes biomarker-positive and biomarker-negative tumor cells. Biomarker-negative tumor cells may be tumor cells which do not express or comprise the respectively used biomarker at all or only to an extent that the resulting intensity values in the second digital image does not allow to identify a biomarker-positive cell membrane and thus does also not allow identifying a biomarker positive tumor cell.

According to some embodiments, at least in case some cancer subtypes do not comprise the biomarker or only to a very small, hardly detectable amount, the totality of tumor cells of the area of the first slide may be determined by counting all cells or all cell nuclei contained in the slide. Said counting may be performed e.g. on the first digital image. In some embodiments, the number of all (biomarker-positive and biomarker-negative) tumor cells may be determined by counting all tumor cells in a first step, counting all non-tumor cells, e.g. lymphocytes or stroma cells, contained in said area of said slide in a second step, and subtracting the counted number of non-tumor cells from the counted number of tumor cells. The "tumor cells" mentioned in table 1 comprise both biomarker-positive tumor cells and biomarker-negative tumor cells and may be determined according to any one of the above described counting approaches. In case it can safely be assumed (this depends on the biomarker and staining system used) that the biomarker is expressed in all tumor cells at least to a degree that allows identification of the cell membrane and thus allows identification of biomarker-positive tumor cells, the number of biomarker positive tumor cells and the number of tumor cells can be considered as being identical, and the counted number of the biomarker-positive tumor cells may be used as the number of all tumor cells.

TABLE 1

Scoring guidelines and staining criteria.

| Clinical Dx | Clinical score | Staining Criteria |
| --- | --- | --- |
| Negative | 0 | No or equivocal staining in tumor cells or <50% tumor cells with membrane and/or cytoplasmic staining (for example, this may imply that if ≤50% of all tumor cells in the examined area of the slide are biomarker-positive tumor cells, the first slide may be assigned the clinical score 0) |
| | 1+ | ≥50% of tumor cells with WEAK or higher membrane and/or cytoplasmic staining but <50% of tumor cells with moderate or higher staining intensity (for example, this may imply that if ≥50% of all tumor cells in the examined area of the slide are biomarker-positive tumor cells and show the above described weak or higher staining intensity, the first slide may be assigned the clinical score 1+) |
| Positive | 2+ | ≥50% of tumor cells with MODERATE or higher membrane and/or cytoplasmic staining but <50% of tumor cells with strong staining intensity. |

TABLE 1-continued

Scoring guidelines and staining criteria.

| Clinical Dx | Clinical score | Staining Criteria |
|---|---|---|
| | | (for example, this may imply that if >50% of all tumor cells in the examined area of the slide are biomarker-positive tumor cells and show the above described moderate or higher staining intensity, the first slide may be assigned the clinical score 2+) |
| | 3+ | ≥50% of tumor cells with STRONG membrane and/or cytoplasmic staining intensity (for example, this may imply that if >50% of all tumor cells in the examined area of the slide are biomarker-positive tumor cells and show the above described strong staining intensity, the first slide may be assigned the clinical score 3+) |

Figure 6:
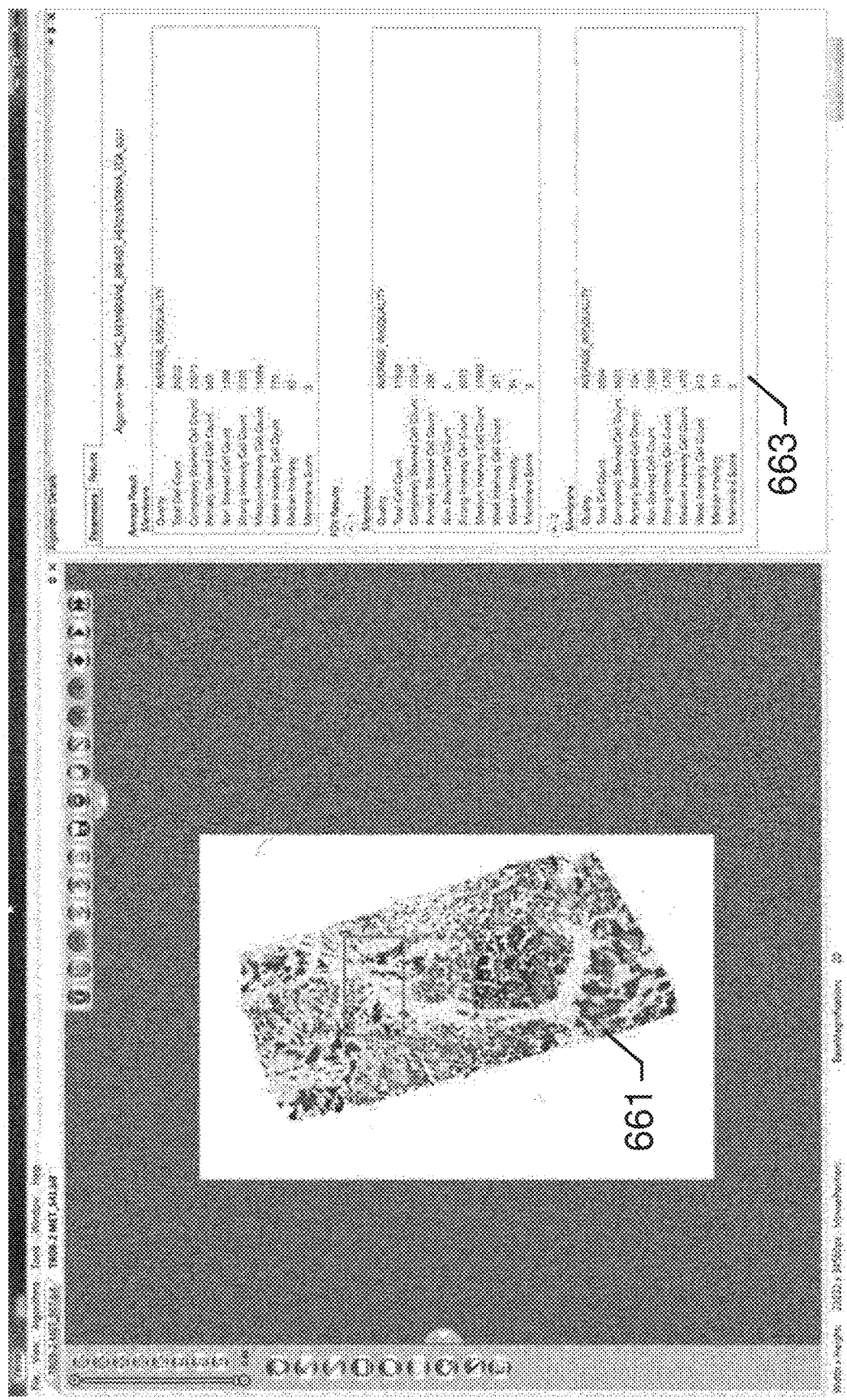
FIG. 6 depicts an exemplary interface for FOV selection and depicting results.

Using the completeness and intensity, scores are assigned to the each cell, and the image is binned based on a percentage of cells meeting score thresholds. Each "cell" in this context means, for example, each tumor cell contained in the examined area of the slide, and in particular, each biomarker-positive tumor cell. The score thresholds are defined by training data, based on tissue size, stain variability, and staining protocols, and may be subjective depending on different laboratories performing the procedure. Therefore, the thresholds may vary, and range from 0-255. Different scoring criteria exist for different types of biomarkers. The output biomarker score is a four-binned score of (0, 1+, 2+, 3+) which is used to give a clinical diagnostic evaluation of the patient being marker positive or negative (ex: MET positive or MET negative; HER2 positive or HER2 negative). The resulting overlay image is output (S306) to a viewer along with score results, as depicted in FIG. 6.

FIGS. 4A-4C depict a method for membrane detection and results of said method, according to an exemplary embodiment of the subject disclosure. The method is based on a stroke-identification operation, in contrast to the spoke-identification operations that are further described herein. The method may begin with an image smoothing operation (S401) using a Gaussian filter, with a given filter mask size. For example, the Gaussian filter may be applied on an RGB digital image of an area of the first slide. A typical mask size of 5×5 pixels may be used. Color deconvolution (S402) is applied to the smoothed RGB image to generate two stain images depicted in FIG. 2A, the "HTX channel image" (which may be considered as an example of the first digital image) highlighting the counter-stained nuclei, and the DAB channel image (which may be considered as an example of the second digital image) highlighting the MET-positive, DAB-stained membrane/cytoplasmic stained cells. In particular, membrane proteins and cytosolic membrane protein domains which may comprise a stained biomarker may be subsumed as "positively stained cell membrane". In the DAB channel image, the bright stained cell membrane regions are detected using stroke detection techniques to pick up all possible strokes in the image first.

According to some embodiments, the stroke detection is based on a "ridge detection" or "line detection" approach. A ridge or line detection approach is an image segmentation method that is based on detecting sharp, local changes in intensity. A line may be viewed as an edge segment in which the intensity of the background on either side of the line is either much higher or much lower than the intensity of the line pixels.

According to other embodiments, the stroke detection of the cell membranes includes identifying pixels belonging to membrane strokes by computing positions for each pixel P in the DAB image (an example of a "second digital image"). See FIG. 4B, depicting an array of pixels p1 through p8. The positions of these pixels are opposite to each other on a diamond. Pixel P is considered as part of stroke if its intensity is a local maximum as compared to the intensities of (p1 to p8). This may be performed by a threshold comparison (S404). If the pixel P meets the threshold for all the pixels p1-p8, it is added as a stroke pixel, and further pixels (S406-S407) are selected, if any, and evaluated for being a stroke pixel as described above. In this approach, an isolated pixel may be viewed as a line whose length and width are equal to one pixel. For example, in the second digital image, the totality of said identified stroke pixels represent the totality of cell membranes identified without taking into consideration positional information of the identified nuclei. Thus, the totality of stroke pixels may comprise several staining artifacts. Upon detection of all stroke pixels, the method may proceed to refinement as further described herein. For example, a binary refinement mask may be generated from the second digital image and applied on the totality of stroke pixels for masking all stroke pixels which do not lie within a maximum distance from any one of the identified nuclei whose centers were mapped to the second digital image.

FIG. 4C depicts a DAB channel image 423 subject to a membrane detection method as described in FIG. 4A, resulting in a membrane stroke detected image 424. As only the membranous and cytoplasmic region (in particular, the cell membrane and cytosolic domains of membrane proteins) of biomarker-positive tumor cells are expected to be stained, image 424 may be further refined to remove non-specific staining and staining artifacts based upon the pixel classified image (also referred herein as "the binary refinement mask") that is a binarized version of the DAB channel image generated by applying Otsu thresholding on the DAB channel image (S301 in FIG. 3A) and/or morphologically cleaned up to remove isolated regions without any significant nuclear or membrane staining.

According to embodiments, the binary refinement mask may further be refined by morphologically analyzing the shape of nuclear blobs mapped to the second digital image whose shape or size indicates that said nuclear blobs relate to non-tumor cells, e.g. lymphocytes or stroma cells. Such nuclear blobs and also a circumferential pixel section around said nuclear blobs may be identified as non-tumor cells and pixels belonging to said non-tumor cells may be turned into mask pixels in the binary refinement mask. In addition, or alternatively, pixels of larger isolated regions in the second digital image not comprising any significant nuclear staining in the first digital image and not comprising any significant cell membrane staining in the second digital image are turned into mask pixels in the binary refinement mask.

In an alternate embodiment to the stroke-detection method described above, a spoke-based cell membrane and cytoplasmic ring detector may be used to detect cell membranes. For example, the detection of the cell membrane may include detecting cytosolic domains of cell membrane proteins stained by the second stain.

Figure 5A:
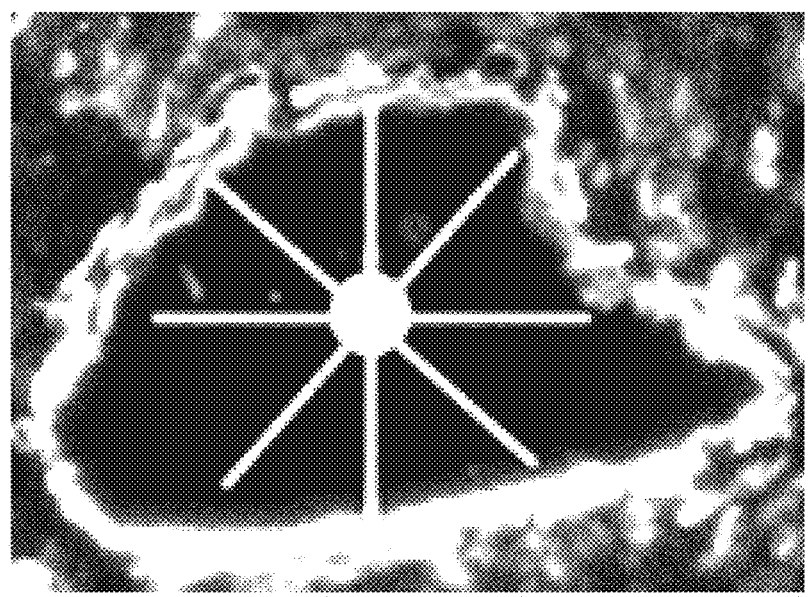
FIGS. 5A-5C depict an exemplary method for detecting cell membranes using spoke-based cell membrane and cytoplasmic ring detector.
Figure 5B:
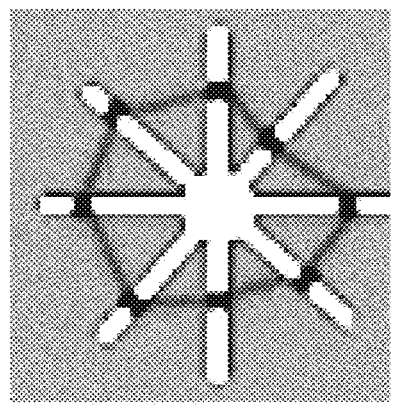
Figure 5C:
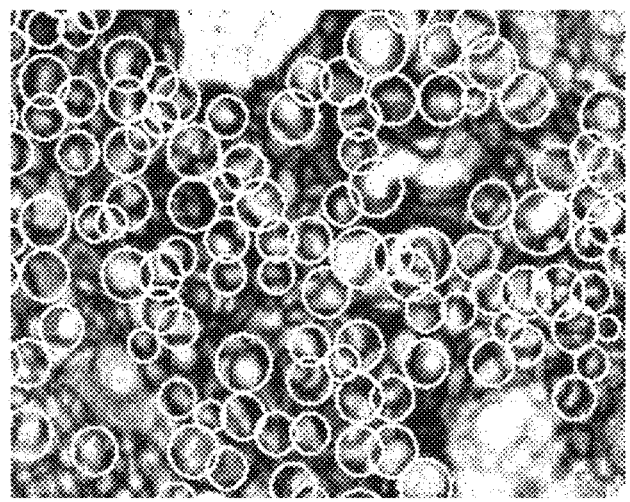

FIGS. 5A-5C describe these operations. Referring to FIG. 5A, at each nucleus center, e.g., the center of each identified nucleus, a membrane and cytoplasmic stained region in the surrounding circular region with a specific radius is analyzed. Said radius is typically set to the maximum expected radius of a cell. The centers of the detected nuclei may be considered as the nuclei seed locations. Given a nucleus center, image intensity values are collected along a set of radial lines (also referred herein as "spoke lines" or "vectors") overlaid outwards from the center. The detector has four parameters. 1) The number of radial lines N, e.g. 16. Their angles are evenly sampled from 0 to 360 degrees. 2) The length of each line. This corresponds to the average radius of the cells. 3) Two intensity thresholds T2 and T2, as explained below. Along each spoke line the min and max intensity values are calculated. For example, along each spoke line the min and max intensity values in the second digital image or a refined image thereof are calculated. For all lines created for a particular nucleus, the median of all max values (MedianMax_I) and the median of all min values (MedianMini) are computed.

FIG. 5B shows a set of radial lines with image intensities depicted as a membrane. If the intensity at the center is Center_I, the region is labeled as a valid membrane if MedianMax_I is at least T1 greater than Center_I and MedianMin_I is at most T2 smaller than Center_I.

According to some embodiments, a set of radial lines may extend from the center of an identified nucleus (mapped to the second digital image) with the highest image intensities in each line depicted as a being automatically connected to each other to represent an identified cell membrane. The intensity at the center of the detected nucleus is Center_I. For example, for calculating the Center_I, MedianMin_I and MedianMax_I, the intensity values of the second digital image are used as input. The set of pixels in each of said lines having the highest intensity values in the second digital image within said line are considered as valid cell membrane pixels and are connected to other maximum intensity pixels of adjacent (neighbor) lines of the same nuclear center if MedianMax_I is at least T1 greater than Center_I and MedianMin_I is at most T2 smaller than Center_I. In some embodiments, if said conditions are not fulfilled, the length of the lines may be increased and the MedianMax_I and the MedianMin_I may be recalculated until a maximum line length is reached or until the conditions are met.

The parameters N, T1 and T2 are adjusted for detection accuracy and speed based on training on a set of representative images with varying image quality and tissue appearance. As this approach does not depend on the absolute intensity values along the membrane but on relative difference between the boundary and interior region it is robust against variations in stain intensities. The spoke-based detection does not require explicit detection of the membrane contour, it is well-suited to detect regions where it is challenging to separate out the interior cytoplasmic region from the membranous regions. FIG. 5C depicts results of the spoke detection identifying a plurality of nuclei and membranes.

For calculating the completeness and/or intensity score, the set of pixels in the second digital image representing cell membranes (including any stained cytoplasmic membrane protein domains) having been identified via the stroke-based or spoke-based approach may be expanded by a predefined set of pixels for creating the belt of pixels used for score calculation. For example, the set of identified cell membrane pixels may be expanded by 2 pixels in direction of the cell center and may in addition be expanded 2 pixels in direction of the extracellular space. The expanded set of pixels may constitute the pixel belt for which the intensity and completeness score is calculated.

FIG. 6 depicts an exemplary interface for FOV selection and depicting results, according to an exemplary embodiment of the subject disclosure. The interface may be provided by the system described in FIG. 1, or a remote system, and may enable operations such as selecting FOVs, and depicting results. For example, the interface depicts an image 661 including one or more fields of view, and scoring results 663 for each FOV in the image.

The disclosed operations therefore provide image analysis systems and methods to score c-MET stained NSCLC tissue slides, based on the representative fields of view, for example, fields of view selected by a pathologist for interpretation. Moreover, besides medical applications such as anatomical or clinical pathology, prostrate/lung cancer diagnosis, etc. The operations disclosed herein may be ported into a hardware graphics processing unit (GPU), enabling a multi-threaded parallel implementation.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft.NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls"

(also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

The invention claimed is:

1. A system for scoring an assay, the system comprising:
one or more processors; and
one or more memories coupled to the processor, the memories to store computer-readable instructions that, when executed by the one or more processors, cause the one or more processors to perform operations comprising:
identifying a plurality of nuclei in a portion of a first image of a biological sample; and
determining whether regions surrounding each identified nuclei of the plurality of identified nuclei may be associated with a membrane; wherein a positive association of one of the identified nuclei with the membrane results in a determination of a positively stained cell; and wherein the determining of whether the regions surrounding each identified nuclei may be associated with a membrane comprises performing a stroke detection operation and/or a spoke detection operation.

2. The system of claim 1, wherein the portion of the image is a whole-tumor region annotated on a hematoxylin image.

3. The system of claim 2, wherein the whole-tumor region annotated on the hematoxylin image is mapped to a cMET image of a corresponding serial section of the biological sample using an inter-marker registration algorithm.

4. The system of claim 3, wherein the operations further comprise computing a slide-level score for the whole-tumor region.

5. The system of claim 1, wherein the portion of the image is a field-of-view annotated on a cMET image.

6. The system of claim 5, wherein the operations further comprise computing a slide-level score for the field-of-view.

7. The system of claim 1, wherein the stroke detection operation comprises
(i) mapping each of the identified nuclei in the first image to a second image of the biological sample to provide a plurality of mapped nuclei in the second image;
(ii) for each pixel in the second image, measuring a relative intensity of a center pixel as compared with pixels in an array surrounding the center pixel,
(iii) comparing the measured relative intensity with a predetermined threshold value; and
(iv) retaining the center pixel as a stroke pixel if the measured relative intensity meets or exceeds the predetermined threshold value.

8. The system of claim 7, wherein the stroke detection operation further comprises masking all stroke pixels which do not lie within a maximum distance from any one of the mapped identified nuclei.

9. The system of claim 8, wherein the masking of the stroke pixels comprises
(i) generating a binary mask from the second image; and
(ii) refining the binary mask using morphological operations.

10. The system of claim 8, wherein the first image comprises signals corresponding to a hematoxylin stain; and wherein the second image comprises signals corresponding to a membrane stain.

11. The system of claim 1, wherein the operations further comprise computing a completeness score and an intensity score.

12. The system of claim 1, wherein the spoke detection operation comprises
(i) mapping each of the identified nuclei in the first image to a second image of the biological sample to provide a plurality of mapped nuclei in the second image; and
(ii) for each mapped nucleus in the second image, evaluating a relative intensity difference between a center of the mapped nucleus and pixels along lines radially extending from the center up to a threshold length value.

13. The system of claim 1, wherein the spoke detection operation comprises
(i) mapping each of the identified nuclei in the first image to a second image of the biological sample to provide a plurality of mapped nuclei in the second image;
(ii) placing a spoke at an approximate center of one of the mapped nuclei, each spoke having a plurality of arms extending radially from a center of the spoke;
(iii) evaluating pixel intensities along each arm and pixel intensities at the spoke center; and
(iv) retaining the spoke selected where it meets intensity threshold values.

14. The system of claim 13, wherein the retaining of the spoke meeting intensity threshold values comprises:
(i) identifying the intensity value of the spoke center;
(ii) identifying a median of the maximum intensity values from all the arms and the spoke center intensity value;
(iii) identifying the median of the minimum intensity values from all the arms and the spoke center intensity value;
(iv) determining (a) if the median of all maximum intensity values is at least a first threshold (Ti) greater than the intensity value at the spoke center;
(v) determining (b) if the median of all minimum intensity values is at most a second threshold (T2) less than the intensity value at the spoke center; and (vi) if (a) and (b) return true, retaining and using the spoke for associating regions surrounding the one or more nuclei with the membrane.

15. The system of claim 13, wherein the first image comprises signals corresponding to a hematoxylin stain; and wherein the second image comprises signals corresponding to a membrane stain.

16. The system of claim 1, wherein the operations further comprise computing a completeness score and an intensity score.

17. A method of scoring an assay comprising:
(i) identifying a plurality of nuclei in a portion of a first image of a biological sample; and
(ii) determining whether regions surrounding each identified nuclei of the plurality of identified nuclei may be associated with a membrane; wherein a positive association of one of the identified nuclei with the membrane results in a determination of a positively stained cell; and wherein the determining of whether the regions surrounding each identified nuclei may be associated with a membrane comprises performing a stroke detection operation and/or a spoke detection operation.

18. The method of claim 17, wherein the stroke detection operation comprises
(i) mapping each of the identified nuclei in the first image to a second image of the biological sample to provide a plurality of mapped nuclei in the second image;
(ii) for each pixel in the second image, measuring a relatively intensity of a center pixel as compared with pixels in an array surrounding the center pixel,
(iii) comparing the measured relative intensity with a threshold value; and
(iv) retaining the center pixel as a stroke pixel if the measured relative intensity meets or exceeds the threshold value.

19. The method of claim 17, wherein the spoke detection operation comprises
(i) mapping each of the identified nuclei in the first image to a second image of the biological sample to provide a plurality of mapped nuclei in the second image; and
(ii) for each mapped nucleus in the second image, evaluating a relative intensity difference between a center of the mapped nucleus and pixels along lines radially extending from the center up to a threshold length value.

20. The method of claim 17, wherein the portion of the first image is a whole-tumor region annotated on a hematoxylin image.

21. The method of claim 20, wherein the whole-tumor region annotated on the hematoxylin image is mapped to a cMET image of a corresponding serial section of the biological sample using an inter-marker registration algorithm.

* * * * *